United States Patent
Gupta et al.

(10) Patent No.: US 10,228,969 B1
(45) Date of Patent: Mar. 12, 2019

(54) OPTIMISTIC LOCKING IN VIRTUAL MACHINE INSTANCE MIGRATION

(71) Applicant: Amazon Technologies, Inc., Seattle, WA (US)

(72) Inventors: Diwakar Gupta, Seattle, WA (US); Georgios Elissaios, Seattle, WA (US); Johannes Stephanus Jansen van Rensberg, Cape Town (ZA); Michael Groenewald, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/750,978

(22) Filed: Jun. 25, 2015

(51) Int. Cl.
| | |
|---|---|
| *G06F 9/44* | (2018.01) |
| *G06F 9/48* | (2006.01) |
| *G06F 9/455* | (2018.01) |
| *G06F 9/54* | (2006.01) |

(52) U.S. Cl.
CPC ........ *G06F 9/4856* (2013.01); *G06F 9/45533* (2013.01); *G06F 9/45558* (2013.01); *G06F 9/541* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,925,850 | B1 * | 4/2011 | Waldspurger | G06F 9/4856 711/162 |
| 8,069,218 | B1 * | 11/2011 | Tormasov | G06F 9/4856 709/212 |
| 8,091,084 | B1 * | 1/2012 | Dobrovolskiy | G06F 9/45558 717/126 |
| 8,387,048 | B1 * | 2/2013 | Grechishkin | G06F 9/45533 718/1 |
| 9,141,625 | B1 * | 9/2015 | Thornewell | G06F 17/30079 |
| 9,197,489 | B1 * | 11/2015 | Vincent | H04L 67/148 |
| 9,361,145 | B1 * | 6/2016 | Wilson | G06F 9/45558 |
| 2006/0005189 | A1 | 1/2006 | Vega et al. | |
| 2008/0127182 | A1 * | 5/2008 | Newport | G06F 9/4856 718/1 |
| 2008/0196026 | A1 * | 8/2008 | Azagury | G06F 9/5088 718/100 |
| 2008/0222375 | A1 * | 9/2008 | Kotsovinos | G06F 9/5083 711/162 |
| 2008/0222633 | A1 * | 9/2008 | Kami | G06F 9/45558 718/1 |
| 2008/0295096 | A1 * | 11/2008 | Beaty | G06F 9/4856 718/1 |
| 2009/0037679 | A1 * | 2/2009 | Kaushik | G06F 3/0617 711/162 |

(Continued)

*Primary Examiner* — Matthew J Brophy
(74) *Attorney, Agent, or Firm* — Davis Wright Tremaine LLP

(57) ABSTRACT

Techniques for optimistic locking of virtual machine instances during a migration are described herein. Application programming interface requests are classified by type. When a request such as an application programming interface request is received during the migration of a virtual machine instance from a source location to a target location, the request is classified according to the type and according to the state of the migration. Based on that classification, it is determined whether to block the request, allow the request, or cancel the migration.

20 Claims, 14 Drawing Sheets

(56) References Cited

U.S. PATENT DOCUMENTS

| | | | |
|---|---|---|---|
| 2009/0055507 A1* | 2/2009 | Oeda | G06F 9/4856 709/216 |
| 2009/0300093 A1* | 12/2009 | Griffiths | G06F 9/5055 709/202 |
| 2010/0131728 A1* | 5/2010 | Miyamae | G06F 3/0605 711/162 |
| 2010/0169253 A1 | 7/2010 | Tan | |
| 2010/0205252 A1* | 8/2010 | Dorai | G06F 9/4856 709/205 |
| 2011/0145471 A1* | 6/2011 | Corry | G06F 9/4856 711/6 |
| 2011/0271278 A1* | 11/2011 | Dittrich | G06F 8/60 718/1 |
| 2012/0017031 A1* | 1/2012 | Mashtizadeh | G06F 9/45558 711/6 |
| 2012/0096460 A1* | 4/2012 | Sekiguchi | G06F 9/45558 718/1 |
| 2012/0110237 A1* | 5/2012 | Li | G06F 9/45558 711/6 |
| 2012/0131567 A1* | 5/2012 | Barros | G06F 9/5088 717/170 |
| 2012/0137098 A1* | 5/2012 | Wang | G06F 3/0617 711/165 |
| 2012/0137285 A1* | 5/2012 | Glikson | G06F 9/4856 718/1 |
| 2012/0311580 A1* | 12/2012 | Emelianov | G06F 9/45558 718/100 |
| 2013/0014102 A1* | 1/2013 | Shah | G06F 9/45558 718/1 |
| 2013/0014103 A1* | 1/2013 | Reuther | G06F 3/0647 718/1 |
| 2013/0054813 A1* | 2/2013 | Bercovici | G06F 9/4856 709/226 |
| 2013/0097296 A1 | 4/2013 | Gehrmann et al. | |
| 2013/0205106 A1* | 8/2013 | Tati | G06F 3/061 711/159 |
| 2013/0212578 A1 | 8/2013 | Garg et al. | |
| 2013/0227559 A1* | 8/2013 | Tsirkin | G06F 9/45558 718/1 |
| 2013/0254424 A1* | 9/2013 | Guay | G06F 9/4856 709/238 |
| 2013/0262390 A1* | 10/2013 | Kumarasamy | H04L 41/0846 707/649 |
| 2013/0304903 A1* | 11/2013 | Mick | H04L 43/0817 709/224 |
| 2013/0305242 A1* | 11/2013 | Wang | G06F 9/45558 718/1 |
| 2014/0019621 A1* | 1/2014 | Khan | G06F 9/4856 709/226 |
| 2014/0082616 A1* | 3/2014 | Kurita | G06F 9/455 718/1 |
| 2014/0115164 A1* | 4/2014 | Kalyanaraman | H04L 29/08954 709/226 |
| 2014/0156958 A1 | 6/2014 | Dow et al. | |
| 2014/0157257 A1* | 6/2014 | Dow | G06F 9/45558 718/1 |
| 2014/0189683 A1 | 7/2014 | Bing et al. | |
| 2014/0196034 A1 | 7/2014 | Amano et al. | |
| 2014/0215172 A1* | 7/2014 | Tsirkin | G06F 11/203 711/162 |
| 2014/0215459 A1* | 7/2014 | Tsirkin | G06F 9/45558 718/1 |
| 2014/0229944 A1* | 8/2014 | Wang | G06F 9/5088 718/1 |
| 2014/0380306 A1* | 12/2014 | Chan | G06F 9/45558 718/1 |
| 2015/0040127 A1* | 2/2015 | Dippenaar | G06F 9/4856 718/1 |
| 2015/0071072 A1* | 3/2015 | Ratzin | H04L 47/11 370/235 |
| 2015/0074670 A1* | 3/2015 | Gerganov | G06F 9/5027 718/103 |
| 2015/0106810 A1* | 4/2015 | Ciano | G06F 9/45533 718/1 |
| 2015/0161151 A1 | 6/2015 | Koryakina et al. | |
| 2015/0169239 A1* | 6/2015 | Sakai | G06F 3/0647 711/162 |
| 2015/0205638 A1* | 7/2015 | Motoki | G06F 9/5088 711/162 |
| 2015/0234673 A1 | 8/2015 | Miyazaki | |
| 2015/0237132 A1* | 8/2015 | Antony | H04L 67/1095 709/224 |
| 2015/0309839 A1* | 10/2015 | Lu | G06F 9/48 710/308 |
| 2015/0331715 A1* | 11/2015 | Sathyanarayana | H04L 67/10 709/226 |
| 2015/0370659 A1* | 12/2015 | Pershin | G06F 11/203 714/4.11 |
| 2015/0370660 A1 | 12/2015 | Pershin et al. | |
| 2015/0378767 A1* | 12/2015 | Tarasuk-Levin | G06F 9/45558 718/1 |
| 2015/0378785 A1* | 12/2015 | Tarasuk-Levin | G06F 9/4881 718/1 |
| 2015/0378831 A1* | 12/2015 | Tarasuk-Levin | G06F 11/1484 714/15 |
| 2015/0378847 A1* | 12/2015 | Tarasuk-Levin | G06F 11/1471 714/19 |
| 2016/0050113 A1 | 2/2016 | Sridhara et al. | |
| 2016/0070597 A1* | 3/2016 | Riggin | G06F 9/5011 718/1 |
| 2016/0306645 A1* | 10/2016 | Serebrin | G06F 9/45558 |
| 2016/0306658 A1* | 10/2016 | Serebrin | G06F 3/0619 |
| 2016/0378518 A1* | 12/2016 | Antony | G06F 9/45533 718/1 |

* cited by examiner

OPTIMISTIC LOCKING IN VIRTUAL MACHINE INSTANCE MIGRATION

CROSS-REFERENCE TO RELATED APPLICATIONS

This application incorporates by reference for all purposes the full disclosure of co-pending U.S. patent application Ser. No. 14/750,991, filed concurrently herewith, entitled "MANAGED ORCHESTRATION OF VIRTUAL MACHINE INSTANCE MIGRATION."

BACKGROUND

Modern computer systems are frequently implemented as collections of virtual computer systems operating collectively on one or more host computer systems. The virtual computer systems may utilize resources of the host computer systems such as processors, memory, network interfaces, and storage services. When the resources of a particular host computer system become scarce due to, for example, overutilization by client virtual computer systems, it may become necessary to move a virtual computer system to a different host computer system to avoid reduced system performance, increased system outages or failures, and a degraded user experience.

One approach to the problem of moving or migrating a virtual computer system to a different host computer system is to halt the virtual computer system, copy the memory and/or the system state of the virtual computer system to the different host computer system, and then restart the virtual computer system. However, in the case of a large or complicated virtual computer system, this migration process can take a significant amount of time, and the ability of a user to interact with the virtual computer system during that time period may be eliminated or at least severely restricted. Additionally, some system resources, such as attached storage and network connections may be volatile, introducing the possibility that the migrated virtual computer system may differ significantly from the original virtual computer system, further introducing operational issues.

BRIEF DESCRIPTION OF THE DRAWINGS

Various embodiments in accordance with the present disclosure will be described with reference to the drawings, in which.

DETAILED DESCRIPTION

Figure 1:
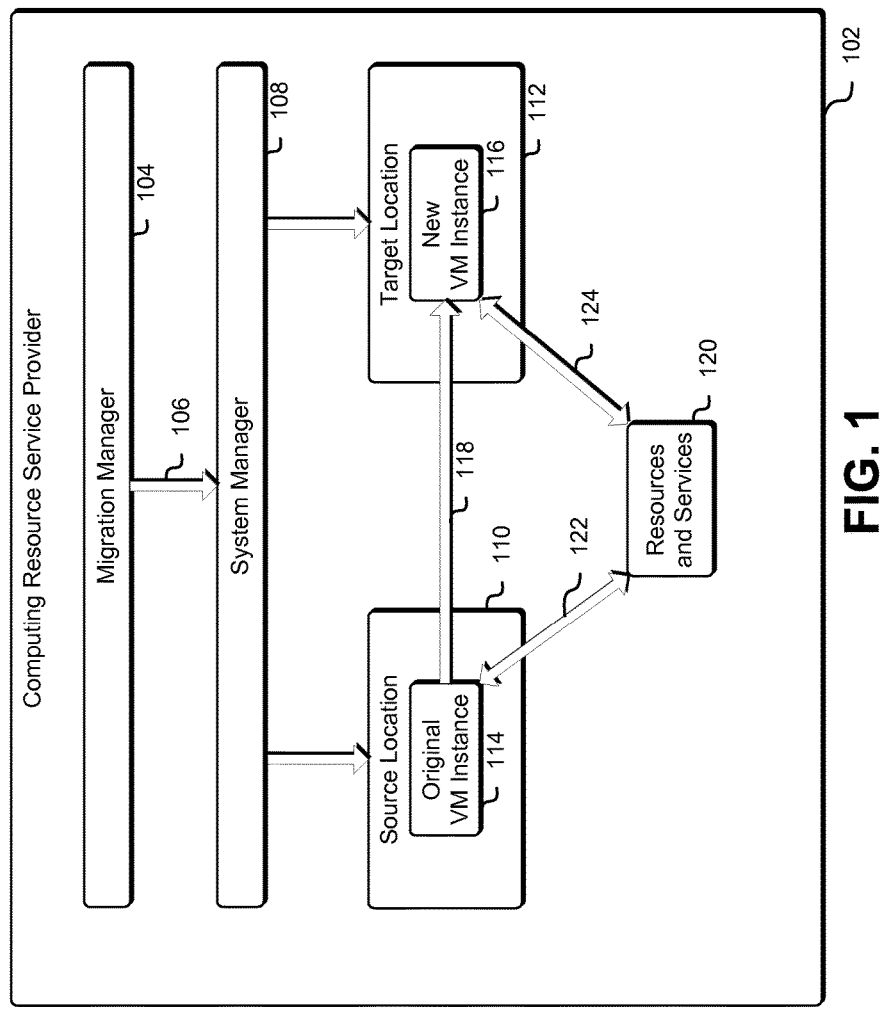
FIG. 1 illustrates an example environment where a virtual machine instance is migrated to a new location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for managing the migration of a virtual machine instance from a source host computer system to a target host computer system. The methods, systems, and processes described herein manage the migration of a virtual machine instance in phases and improve both the length and impact of a critical migration phase. As an example of improving the length and impact of the critical migration phase, the length and impact can be minimized by performing a majority of the migration before locking the virtual machine and thus minimizing the amount of time that the virtual machine is unavailable. In some examples, such improvement is attained by optimistically locking the source virtual machine during the critical migration phase, classifying application programming interface requests and other requests that are received by the source virtual machine instance during the critical migration phase, and reducing user or customer impact associated with the migration by cancelling and rescheduling the migration in the event that a request whose fulfillment alters the source virtual machine is received during the critical migration phase.

In the first phase, after it has been determined that a running virtual machine instance is a candidate for migration from a first host computer system (also referred to as the "source" or the "source location") to a suitable second host computer system (also referred to as the "target" or the "target location"), the second host computer system may be prepared for the migration by the migration manager. This preparation may include ensuring that the right operating system and/or applications are running on the target location and that the target location has sufficient resources available to host the virtual machine instance.

In the second phase, a new instance of the virtual machine may then be created on the target with the same configuration as the running virtual machine instance (also referred to as the "original virtual machine instance") by the migration manager and memory and state information from the original virtual machine instance may copied to the new virtual machine instance while the original virtual machine instance continues to run.

Prior to locking the original virtual machine instance during the critical migration phase (also referred to as the "flip"), a majority of the memory and/or state of the running virtual machine instance may be copied to the new virtual machine instance so that the difference between the two virtual machines is minimized. This copying may keep the differences between the two virtual machines to a minimum by forwarding any changes to the memory or state of the original virtual machine instance to the new virtual machine instance. Such changes to the memory or state of the original virtual machine may occur as a result of, for example, one or more application programming interface ("API") requests received by the original virtual machine instance.

In the third phase, the original virtual machine instance may then be locked by the migration manager, so that the final changes to the memory and/or state of the original virtual machine instance may be propagated to the new virtual machine instance, ensuring that the two virtual machine instances are sufficiently the same so as to not disrupt the user experience. In an embodiment, the final changes to the memory and/or state of the original virtual machine instance can be propagated to the new virtual machine instance so that the two virtual machine instances are identical. This phase, the flip phase, must be kept as short as possible so that the user experience is not degraded due to a perception that the original virtual machine is locked.

While the flip is in progress, the original virtual machine instance may be optimistically locked in that any additional API requests received by the original virtual machine may be classified according to whether they cause changes ("mutations") to the original virtual machine instance, whether they cause mutations to the source location, or whether they do not cause any mutations. The classification of the API requests may be based on a categorization of one or more types of API requests. For example, API requests of the type that describe resources may have a "describe" categorization and, based on the fact that API requests that merely describe resources are non-mutating, all API requests of the "describe" categorization may be assigned a non-mutating classification. Each request may have one or more classifications or categorizations, which may be predetermined and/or may be selected from a set of classifications or categorizations.

Those API requests that do not cause (i.e., whose fulfillment does not cause) any mutations may generally be allowed. Those API requests that cause mutations may cause the migration to be terminated and rescheduled for a later time. Those API requests that cause mutations may also be blocked (or queued) until the flip is complete, and then they may be sent to the new virtual machine instance. Some API requests received by the original virtual machine instance may be unblockable such as, for example, those that change the fundamental state of the original virtual machine instance or those that require a significant amount of time to complete. Such unblockable API requests may also cause the migration to be cancelled and/or rescheduled for a later time.

In the fourth phase, if the flip completes successfully, access to the new virtual machine instance may be provided to the user, connections to resources associated with the original virtual machine instance may be terminated, and after the original virtual machine instance and the new virtual machine instance have converged (i.e., after all pending calls have been received and correctly propagated), the original virtual machine instance may be terminated and resources associated with the original virtual machine instance may be reclaimed (this process is also referred to as "tearing down," being "torn down," or as a "tear down"). Conversely, if in the fourth phased the flip does not complete successfully due to an error, a cancellation of the migration, or some other such event, access to the original virtual machine instance may be returned to the user (i.e., it may be unlocked) and the new virtual machine instance may be torn down.

In an example of how a migration manager may orchestrate the migration of a virtual machine instance, a user may have access to a virtual machine instance running on a first host computer system provided by a computing resource service provider. If it is determined that the virtual machine instance should be migrated to a second host computer system, a new virtual machine instance may be instantiated on that second host computer system and the process of copying memory and/or state from the virtual machine instance on the first host computer system to the new virtual machine instance on the second host computer system. During this copy, the virtual machine instance will continue to operate on the first host computer system and the user may not have any indication that this phase of the migration process is occurring.

When the copy is complete, and the memory and state of the new virtual machine instance are sufficiently the same as the memory and state of the original virtual machine instance, the original virtual machine instance may be locked. During the lock, the final memory and state of the original virtual machine instance are copied to the new virtual machine instance. Any changes that occur during the lock may either be allowed or blocked. Those changes that cause sufficient changes to the memory or state of the source virtual machine, and thus that cause an increase in time that the original virtual machine may be locked, may cause the in-progress migration to be cancelled and rescheduled for a later time. The canceling behavior is intended to minimize the amount of time that the original virtual machine is locked so that the user might not perceive that the virtual machine is not responding.

If the flip completes successfully, the new virtual machine instance will then be operable and the user may then have access to the new virtual machine instance that is perceptually identical to the original virtual machine instance. If the flip does not complete successfully, either as a result of an error, a cancellation, or some other such event, the original virtual machine instance will be unlocked and the user will continue to have access to the original virtual machine instance. The cancelled migration may then be rescheduled for a later time.

FIG. 1 illustrates an example environment 100 where a virtual machine instance is migrated to a new location in accordance with at least one embodiment. One or more virtual machine instances may be operating on host computer systems provided by a computing resource service provider 102 as described herein. In the example illustrated in FIG. 1, a first virtual machine instance (the original VM instance 114) is running in a first location (the source location 110). The first location may be one or more host computer systems configured to provide shared hardware to a virtual computer system service for the instantiation of one or more virtual machine instances. The original VM instance 114 may be one of a plurality of virtual machine instances associated with the source location 110. Each of the plurality of virtual machine instances associated with the source location 110 may be running, may be paused, may be suspended (e.g., paused and stored to secondary storage), or may be in some other state. In the example illustrated in FIG. 1, the original VM instance 114 is running (i.e., is performing one or more operations).

In the course of the operation of the original VM instance 114, it may be determined that the original VM instance 114 can be migrated from the source location 110 to a target location 112. The determination that the original VM instance 114 can be migrated from the source location 110 to a target location 112 may be made as a result of changes in the availability of resources at the source location 110 (e.g., a shortage of computing power, a shortage of memory, or a lack of network bandwidth). The determination that the original VM instance 114 can be migrated from the source location 110 to a target location 112 may also be made to move the original VM instance 114 logically closer to one or more computing resource service provider resources. The determination that the original VM instance 114 can migrated from the source location 110 to a target location 112 may include determining one or more candidate locations from a set of available candidate locations based on resource availability, location, cost, or other selection criteria.

The determination that the original VM instance 114 can be migrated from the source location 110 to a target location 112 may also be made by a customer request to, for example, reduce one or more costs associated with the original VM instance 114. The determination that the original VM instance 114 can be migrated from the source location 110 to a target location 112 may also be made by a service, process, or module operating in association with the computing resource service provider that may be configured to determine more optimal locations form virtual machine instances. In the example illustrated in FIG. 1, the target location 112 is shown within the computing resource service provider 102. In an embodiment, either the source location 110, the target location 112, or both can be outside of the computing resource service provider 102 (e.g., they may be provided by customer and/or other third party environments).

The request to migrate the original VM instance 114 from the source location 110 to the target location 112 may be received by a migration manager 104 operating with the computing resource service provider 102. In an embodiment, the migration manager 104 is implemented as a service that may be one of a plurality of services provided by the computing resource service provider 102. The migration manager 104 may also be referred to herein as a migration manager computer system and, in some embodiments, can be implemented as a distributed computer system as described herein.

When migrating the original VM instance 114 from the source location 110 to the target location, a number of systems, services, processes, and resources may be communicating with the original VM instance 114. These systems, services, processes, and resources cannot generally be guaranteed to change their behavior simultaneously so that their communications switch from the original VM instance 114 at the source location 110 to a new VM instance 116 at the target location 112. The migration manager 104 may be configured to communicate with each of the plurality of systems, services, processes, and resources in order to manage the migration.

The migration manager 104 may be configured to manage (or orchestrate) the migration by selecting one or more operations to perform based at least in part on the state of the migration and/or the classification of one or more requests (e.g., application programming interface requests) and then by performing those selected operations. For example, the migration manager may select and perform one or more operations to determine the proper order for migration, manage a workflow for migration, issue commands to the systems, services, processes, and resources associated with the migration, determine whether the migration is successful, start and stop virtual machine instances, determine whether the migration has failed, determine whether the migration should be cancelled, and manage a migration rollback if errors occur.

During a migration, each of the plurality of systems, services, processes, and resources associated with the migration may only be made aware of their portion of the migration. The migration manager 104 may manage the migration in phases as described herein and may manage the migration of each of the plurality of systems, services, processes, and resources associated with the migration by issuing API requests, making library calls, using interfaces (e.g., a web interface), or by some other means. The phase of a migration (also referred to herein as the "current state of the migration") may determine whether requests such as application programming interface requests may be allowed or blocked, and may also be used to determine whether a migration should be cancelled. The migration manager 104 may also manage timeouts for each of the phases and/or for each migration action associated with each of the plurality of systems, services, processes, and resources associated with the migration which may also be used to determine whether a migration should be cancelled. For example, a block storage service may, during a migration, receive an API request from the migration manager 104 to provide access to a block storage device to the new VM instance 116. As part of this access, the block storage service may need to synchronize input-output ("I/O") requests between the original VM instance 114 and the new VM instance 116. The migration manager 104 may establish a timeout value for this synchronization so that, for example, if the block storage service does not respond to the API request in a reasonable amount of time, the migration may be cancelled.

When the request to migrate the original VM instance 114 from the source location 110 to the target location 112 is be received by a migration manager 104 operating with the computing resource service provider 102, one or more commands 106 may be generated by the migration manager 104 in response to that request. The one or more commands 106 may then be sent to a system manager 108 operating with the computing resource service provider 102. In an embodiment, the system manager 108 is implemented as a service that may be one of a plurality of services provided by the computing resource service provider 102. The system manager 108 may be configured to manage resources of a computing resource service provider 102 where such resources may be provided by computer systems in a distributed and/or virtual computing environment.

The one or more commands 106 that may be sent from the migration manager 104 to the system manager 108 in response to the request to migrate may include commands to configure the target location to instantiate a new virtual machine instance, commands to instantiate a new virtual machine instance at the target location 112, commands to copy the memory and/or state from the original VM instance 114 to a new VM instance 116, commands to deactivate the original VM instance 114, commands to activate the new VM instance 116, commands to lock either the original VM instance 114 or the new VM instance 116, commands to pause either the original VM instance 114 or the new VM instance 116, commands to unpause either the original VM instance 114 or the new VM instance 116, commands to forward memory and/or state information from the original VM instance 114 to the new VM instance 116, commands to tear down the original VM instance 114, commands to terminate a migration between the source location 110 and the target location 112, and other such commands associated with the migration 118 of the original VM instance 114 from the source location 110 to the target location 112.

The original VM instance 114 may have access 122 to one or more resources and services 120 provided by the computing resource service provider 102. For example, the computing resource service provider may provide access 122 to resources and services 120 such as network interfaces, storage services, authentication services, authorization services, and/or other resources and services. As part of the migration 118 of original VM instance 114 from the source location 110 to a target location 112, the migration manager 104 and/or the system manager 108 may instantiate a new VM instance 116 at the target location 112 and may provide access 124 to the same resources and services 120 as may be provided to the original VM instance 114.

Figure 2:
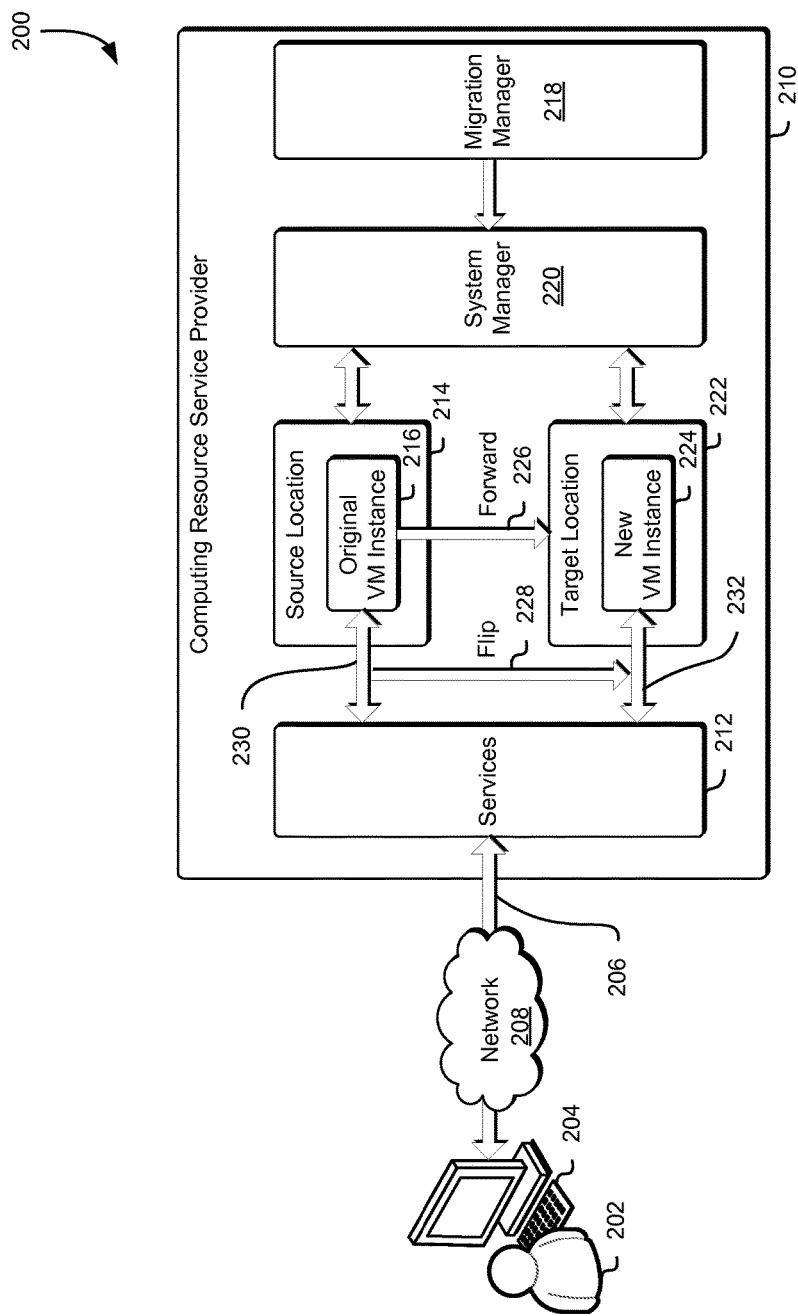
FIG. 2 illustrates an example environment where the migration of a virtual machine instance is managed.

FIG. 2 illustrates an example environment 200 where the migration of a virtual machine instance is managed as described in FIG. 1 and in accordance with at least one embodiment. A user 202 may connect 206 to one or more services 212 through a computer system client device 204. The services 212 may be provided by a computing resource service provider 210. In some embodiments, the computing resource service provider 210 may provide a distributed, virtualized, and/or datacenter environment within which one or more applications, processes, services, virtual machines, and/or other such computer system entities may be executed. In some embodiments, the user 202 may be a person, or may be a process running on one or more remote computer systems, or may be some other computer system entity, user, or process.

The command or commands to connect to the computer system instance may originate from an outside computer system and/or server, or may originate from an entity, user or process on a remote network location, or may originate from an entity, user or process within the computing resource service provider, or may originate from a user of the computer system client device 204, or may originate as a result of an automatic process, or may originate as a result of a combination of these and/or other such origin entities. In some embodiments, the command or commands to initiate the connection 206 to the computing resource service provider 210 may be sent to the services 212, without the intervention of the user 202. The command or commands to initiate the connection 206 to the services 212 may originate from the same origin as the command or commands to connect to the computing resource service provider 210, or may originate from another computer system and/or server, or may originate from a different entity, user, or process on the same or a different remote network location, or may originate from a different entity, user, or process within the computing resource service provider, or may originate from a different user of a computer system client device 204, or may originate as a result of a combination of these and/or other such same and/or different entities.

The user 202 may request connection to the computing resource service provider 210 via one or more connections 206 and, in some embodiments, via one or more networks 208 and/or entities associated therewith, such as servers connected to the network, either directly or indirectly. The computer system client device 204 that may request access to the services 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines, and/or other types of computing devices and/or components. The network may include, for example, a local network, an internal network, a public network such as the Internet, or other networks such as those listed or described below. The network may also operate in accordance with various protocols such as those listed or described below.

The computing resource service provider 210 may provide access to one or more host machines, as well as provide access one or more virtual machine (VM) instances as may be operating thereon. The services 212 provided by the computing resource service provider 210 may also be implemented as and/or may utilize one or more VM instances as may be operating on the host machines. For example, the computing resource service provider 210 may provide a variety of services to the user 202 and the user 202 may communicate with the computing resource service provider 210 via an interface such as a web services interface or any other type of interface. While the example environment illustrated in FIG. 2 shows a single connection or interface for the services 212 of the computing resource service provider 210, each of the services may have its own interface and, generally, subsets of the services may have corresponding interfaces in addition to or as an alternative to the single interface.

The computing resource service provider 210 may provide various services such as the services 212 to its users or customers. The services provided by the computing resource service provider 210 may include, but may not be limited to, virtual computer system services, block-level data storage services, cryptography services, on-demand data storage services, notification services, authentication services, policy management services, or other services. Not all embodiments described may include all of these services, and additional services may be provided in addition to or as an alternative to the services explicitly described. As described above, each of the services 212 may include one or more web service interfaces that enable the user 202 to submit appropriately configured API requests to the various services through web service requests. In addition, each of the services 212 may include one or more service interfaces that enable the services to access each other (e.g., to enable a virtual machine instance provided by the virtual computer system service to store data in or retrieve data from an on-demand data storage service and/or to access one or more block-level data storage devices provided by a block-level data storage service).

In an example, a virtual computer system service may be a collection of computing resources configured to instantiate virtual machine instances on behalf of a customer such as the user 202. The customer may interact with the virtual computer system service (via appropriately configured and authenticated API requests) to provision and operate virtual machine instances that are instantiated on physical computing devices hosted and operated by the computing resource service provider 210. The virtual computer system service may also be configured to initiate the migration of virtual machine instances as described herein. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

In another example, a block-level data storage service may comprise one or more computing resources that collectively operate to store data for a customer using block-level storage devices (and/or virtualizations thereof). The block-level storage devices of the block-level data storage service may, for example, be operationally attached to virtual machine instances provided by the virtual computer system service described herein to serve as logical units (e.g., virtual drives) for the computer systems. A block-level storage device may enable the persistent storage of data used/generated by a corresponding virtual machine instance where the virtual computer system service may only provide ephemeral data storage for the virtual machine instance.

In the example illustrated in FIG. 2, the one or more services 212 may be implemented as, or may be supported by one or more virtual machine instances as described above. For example, the one or more services 212 may include an original VM instance 216 visible to the user 202 (i.e., configured such that the user 202 may use and/or otherwise interact with the original VM instance 216). The original VM instance 216 may be running at first, or source location 214, as described above. Upon receiving a command to migrate the original VM instance 216 from the source location 214 to a target location 222, a migration manager 218 may direct the system manager 220 to begin the migration from the source location 214 to the target location 222 as described above. The migration may be accomplished by instantiating a new VM instance 224 at the target location 222 and copying memory and/or state from the original VM instance 216 to the new VM instance 224. The migration may also be accomplished by forwarding 226 memory and/or state changes from the original VM instance 216 to the new VM instance 224. For example, if during the migration, the user 202 alters a memory location on the original VM instance 216 (e.g., as a result of executing an application) after that memory has copied from the original VM instance 216 to the new VM instance 224, the new memory value may be forwarded to the new VM instance 224. This forwarding 226 of memory and/or state changes may serve to keep the new VM instance 224 synchronized with the original VM instance 216 during migration.

As described herein, the last phase of the migration prior to cleanup is the flip 228. During the flip 228, the original VM instance 216 may have some or all changes locked out so that the user 202 and/or other processes associated with the original VM instance 216 may not alter or mutate the original VM instance 216. During the flip 228, any remaining differences between the original VM instance 216 and the new VM instance 224 may then be copied from the original VM instance 216 to the new VM instance 224. If the flip 228 is successful, the connection 230 from the services 212 to the original VM instance 216 may be replaced by a connection 232 from the services 212 to the new VM instance 224 so that, from the user's perspective, the backing VM instance appears to be the same as before the migration (because, for example, the new VM instance 224 may be substantially the same as the original VM instance 216). If the flip is not successful, the connection 230 from the services 212 to the original VM instance 216 may be retained so that, from the user's perspective, the backing VM instance is appears to be the same as before the attempted migration (because it has not changed). Thus, regardless of whether the migration is successful or not (e.g., because of failure or cancellation), the user may still perceive the same system state and may consider the original VM instance 216 and the new VM instance 224 as the same.

In an embodiment, after the flip 228, if the flip is successful, the original VM instance 216 is no longer accessible to the user 202 and/or to the services 212. After the flip 228, if the flip is not successful, the new VM instance 224 is not accessible to the user 202 and/or to the services 212. This is to ensure that, after the flip, only one of the two virtual machine instances is available to the user 202 and/or to the services 212. As part of the flip 228, the migration manager 218 and/or one or more agents or services under the direction of the migration manager 218 will enable at most one of the virtual machine instances by, for example, unpausing at most one paused virtual machine instance, unlocking at most one locked virtual machine instance, enabling at most one disabled virtual machine instance, or a combination of these or other operations to cause at most virtual machine instance to running after the flip 228.

In an embodiment, when errors occur during the flip 228, the migration manager 218, the system manager 220, or some other computer system entity (e.g., a hypervisor or an agent running on the source location and/or on the target location) performs one or more operations in response to the error. Examples of errors that may occur include, but are not limited to, the failure to prepare the target location 222 to instantiate the new VM instance 224, the failure to attach one or more resources to the new VM instance 224, the failure to detach one or more resources from the original VM instance 216, or some other failure (e.g., a power outage during migration). Such errors may be ignored if they are of a type classified as not being harmful to the migration or if ignoring the error allows the error to be processed by some other process, module, application, or service. For example, an error in migrating a device may be ignored if ignoring such an error results in the device being impaired after the migration and such impairment is detected by a process, module, application, or service associated with the device. Such errors may also cause the migration manager 218 and/or one or more other services to cancel the migration and attempt to undo the migration by undoing the operations that occurred prior to the attempted flip.

As an example of operations that could be performed to undo the migration, the migration manager 218 and/or one or more other services may invalidate, disable, and/or deactivate one or more credentials to access resources that may have been granted to the new VM instance 224 at the target location 222. The migration manager 218 and/or one or more other services may also re-validate, enable, and/or reactivate one or more credentials to access resources that may have been suspended for the original VM instance 216 at the source location 214 In an embodiment, the migration manager 218 and/or one or more other services restores the state of the system to the point before the migration by performing a new attachment to the resources, thus generating a new set of credentials to access the resources.

In another embodiment, the migration manager 218 provides a workflow to perform the flip 228, directing the original VM instance 216 and/or to the source location 214 to perform one or more operations to cause the flip to occur. In this embodiment, the migration manager 218 also provides a workflow to perform the flip 228, directing the original VM instance 216 and/or to the source location 214 to perform one or more operations to cause the flip to occur. In such an embodiment, the migration manager 218 also provides one or more workflow operations to the original VM instance or the new VM instance to undo the flip in the event of an error.

One or more actions may be performed in association with the workflow to handle errors and/or to undo the flip, depending on the cause and severity of the error. For example, the errors may be handled by resuming the original VM instance 216 at the source location 214 or by resuming the new VM instance 224 at the target location 222. In the event that the migration manager 218 cannot easily determine which VM instance to resume (e.g., in the event of a loss of a connection between the VM instances where the migration manager 218 cannot determine the state of the VM instances), the migration manager 218 may send commands to both of the VM instances, putting them both in a waiting state before determining which VM instance to resume and which to terminate. In the event of a catastrophic failure such as, for example, a power outage during the migration, the migration manager 218 may also have to wait until after power restoration to determine the state of the VM instances and/or to determine which may be resumed or restarted. As described above, the migration manager 218 performs operations that cause at most one VM instance to running at the end of the flip. In the event of a catastrophic failure, the migration manager may not be able to determine which VM instance to resume and may instead issue an alarm or an alert to inform an entity associated with the computing resource service provider of the indeterminable state.

In an embodiment, the migration manager 218 can determine whether the flip is successful by comparing a state of the original VM instance 216 to a state of the new VM instance 224. The state of the original VM instance 216 can be determined after the original VM instance 216 is locked and can be updated due to changes that may occur as the original VM instance 216 converges. The state of the new VM instance 224 can be determined after the flip has completed and after all changes have been forwarded from the original VM instance 216 to the new VM instance 224 (e.g., also after the original VM instance 216 converges). If a difference between the state of the original VM instance 216 and the state of the new VM instance 224 is below a minimum success threshold (i.e., the differences are minor, insignificant, or immaterial), then the flip is successful. Conversely if the difference between the state of the original VM instance 216 and the state of the new VM instance 224 is above the minimum success threshold (i.e., the differences are major, significant, or material), then the flip is a failure. Note that when the migration is cancelled or when requests are blocked, the differences may be above the minimum success threshold and the flip may be a failure.

Figure 3:
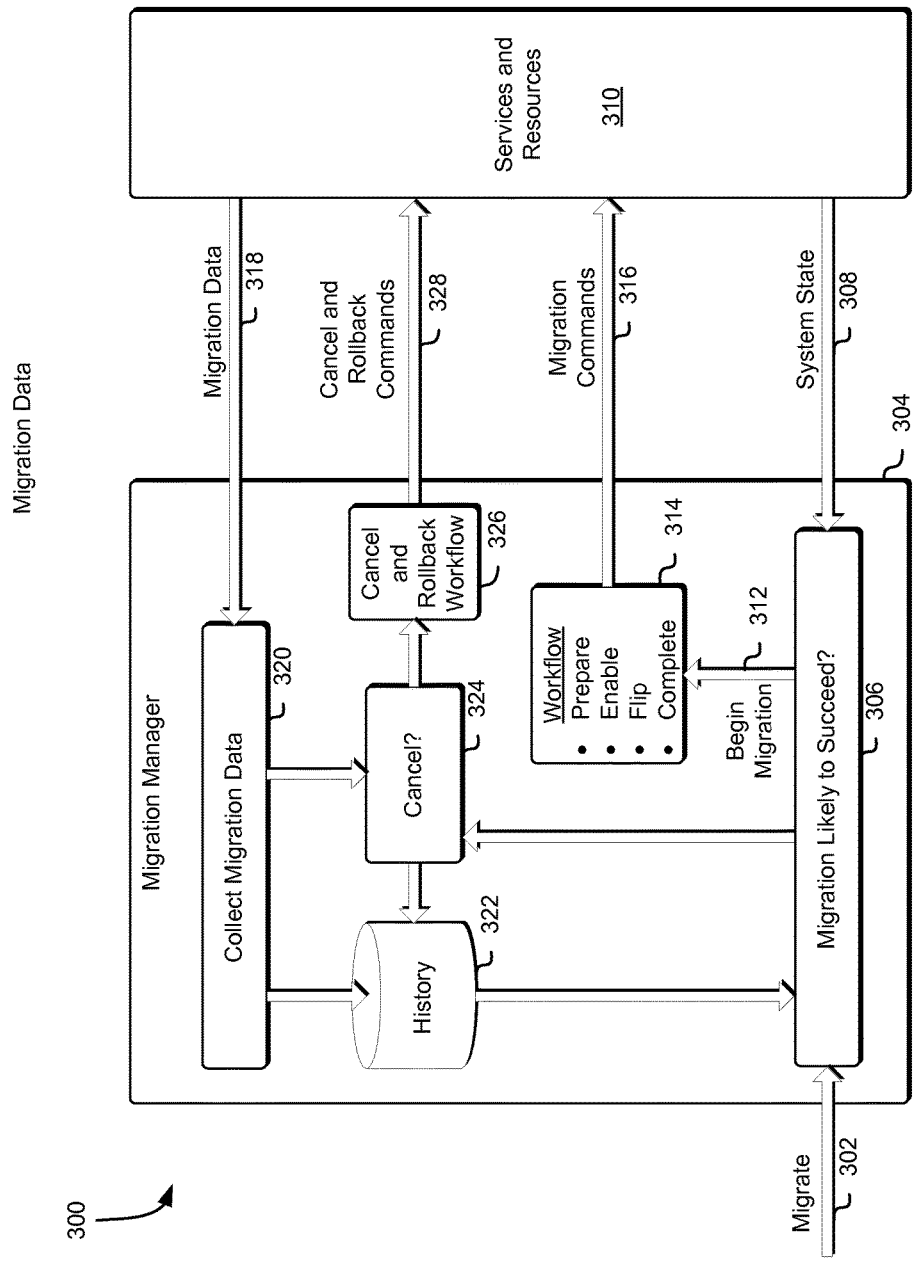
FIG. 3 illustrates an example environment where a workflow associated with the migration of a virtual machine instance is presented.

FIG. 3 illustrates an example environment 300 where a workflow associated with the migration of a virtual machine instance is presented as described in FIG. 1 and in accordance with at least one embodiment. A request to migrate 302 a virtual machine may be received by a migration manager 304 as described above. In an embodiment, the migration manager determines whether the migration is likely to succeed 306 based on an indicator of success of the migration (also referred to herein as determining a "likelihood of success of the migration" or more simply as determining a "likelihood of success"). For example, the migration manager 304 may determine an indicator of success of the migration by calculating a probability (e.g., between zero and one) determined from on a probability model based on past migrations. The migration manager may also determine an indicator of success of the migration by examining a system state 308 (as described herein) and determining whether a set of conditions has been satisfied and/or is likely to be satisfied. As may be contemplated, the methods of determining an indicator of success of a migration described herein are merely illustrative examples and other methods of determining an indicator of success of a migration may be considered as within the scope of the present disclosure.

The determination of the indicator of success of the migration, or whether the migration is likely to succeed 306, may include evaluating the system state 308 of one or more services or resources 310. For example, if the system state 308 indicates that a virtual machine is currently experiencing a very high volume of network or storage activity, that virtual machine may not be a good candidate for migration. The determination of whether the migration is likely to succeed 306 may also include evaluating a migration history 322 (also referred to herein as "migration history data") that includes results (e.g., the type of migration and whether it was successful or not) of one or more previous virtual machine migrations (also referred to herein as "previous migrations"). The migration history data may also include one or more prior system states from one or more previous migrations. For example, if the migration history 322 indicates that a certain type of virtual machine instance is rarely successfully migrated because, for example, one of the steps times out, then that virtual machine may also not be a good candidate for migration.

As a result of determining that the migration is a good candidate for migration and, for example, that the migration is likely to succeed 306, the migration manager 304 may then begin the migration 312. The migration may be based on a migration workflow 314 that may split the migration into phases as described herein. The migration workflow 314 may specify an order of one or more migration operations configured to, for example, prepare the target, commission the target location, flip the virtual machine, complete the migration cleanup, and/or other such migration operations. In the example illustrated in FIG. 3, the migration workflow 314 is split into four phases: a prepare phase, a commission phase, a flip phase, and a cleanup phase. These four phases are described in more detail below. A migration workflow is configured so that the migration manager 304 may determine the correct API requests and/or the order of those API requests so that the migration commands 316 sent to the services and resource 310 are performed in the correct order. If it is not determined that the migration is likely to succeed 306, the migration manager may send a message indicating as such to a requestor and/or may queue the migration so that if may be attempted at a later time.

Based on the migration workflow 314, the migration manager 304 may begin generating migration commands 316 to be sent to the services and resources 310 associated with the migration. In an embodiment, the services and resources are provided by a computing resource service provider, such as the computing resource service provider 102 described in connection with FIG. 1. In another embodiment, some or all of the services and resources are provided by a customer or a third party associated with the computing resource service provider.

During the migration phases, the system state 308 may be continually monitored by the migration manager 304 so that, for example, spikes in resource demand may be determined. Additionally, migration data 318 may be collected 320 such as, for example, the length of time that migration sub-steps take to complete (e.g., how long it takes to perform a migration operation associated with a particular service or resource), whether such sub-steps succeed or fail, or possible reasons for success or failure. The migration data 318 may be collected 320 and stored in the migration history 322 to inform subsequent migrations. Based on the system state 308 and/or based on the migration data 318, the migration manager 304 may determine whether or not to cancel 324 the migration before it completes. The migration manager 304 may also determine whether or not to cancel 324 the migration in the event of a timeout as described herein.

If it is determined to cancel 324 the migration, the migration manager 304 may perform the cancellation based on a cancel and rollback workflow 326 (also referred to herein as a "cancellation workflow") that may specify the order for a set of cancellation operations and may also specify the order for a set of rollback operations. In an embodiment, the cancel and rollback workflow 326 is part of the migration workflow 314 (i.e., the cancellation and rollback workflow is a subset of the set of operations that specify the migration workflow). The set of cancellation operations and the set of rollback operations, collective referred to herein as a set of cancel and rollback commands 328 may be sent to the services and resources 310 as a result of the cancel and rollback workflow being performed by the migration manager 304. The decision to cancel 324 the migration may also be stored in the migration history 322.

The system state 308 and/or the migration data 318 may be used to determine whether a migration should occur as described herein, may be used to determine the best time to perform a migration, and/or may also be used to determine whether the migration is proceeding correctly. In an embodiment, the system state 308 and/or the migration data 318 can also be used by the migration manager 304 to improve workflows, adjust timeouts, improve memory convergence, or to determine other parameters associated with a migration. In such an embodiment, the migration manager 304 can include a machine learning system configured to receive the system state 308 and/or the migration data 318 and evaluate it against the migration history 322 to improve workflows, adjust timeouts, improve memory convergence, or to determine other parameters associated with a migration. The machine learning system may also be configured to improve determinations about when and how to cancel a migration and/or to improve determinations about which migrations are especially good (or especially bad) candidates. Additionally, although not illustrated in FIG. 3, the system state 308 may also be used in conjunction with the migration workflow 314 to, for example, alter the workflow, make workflow decisions (e.g., to perform certain actions in response to changes in the system state 308), or to execute workflow steps such as, for example, to perform cleanup, cancel, or rollback operations associated with the migration.

Figure 4:
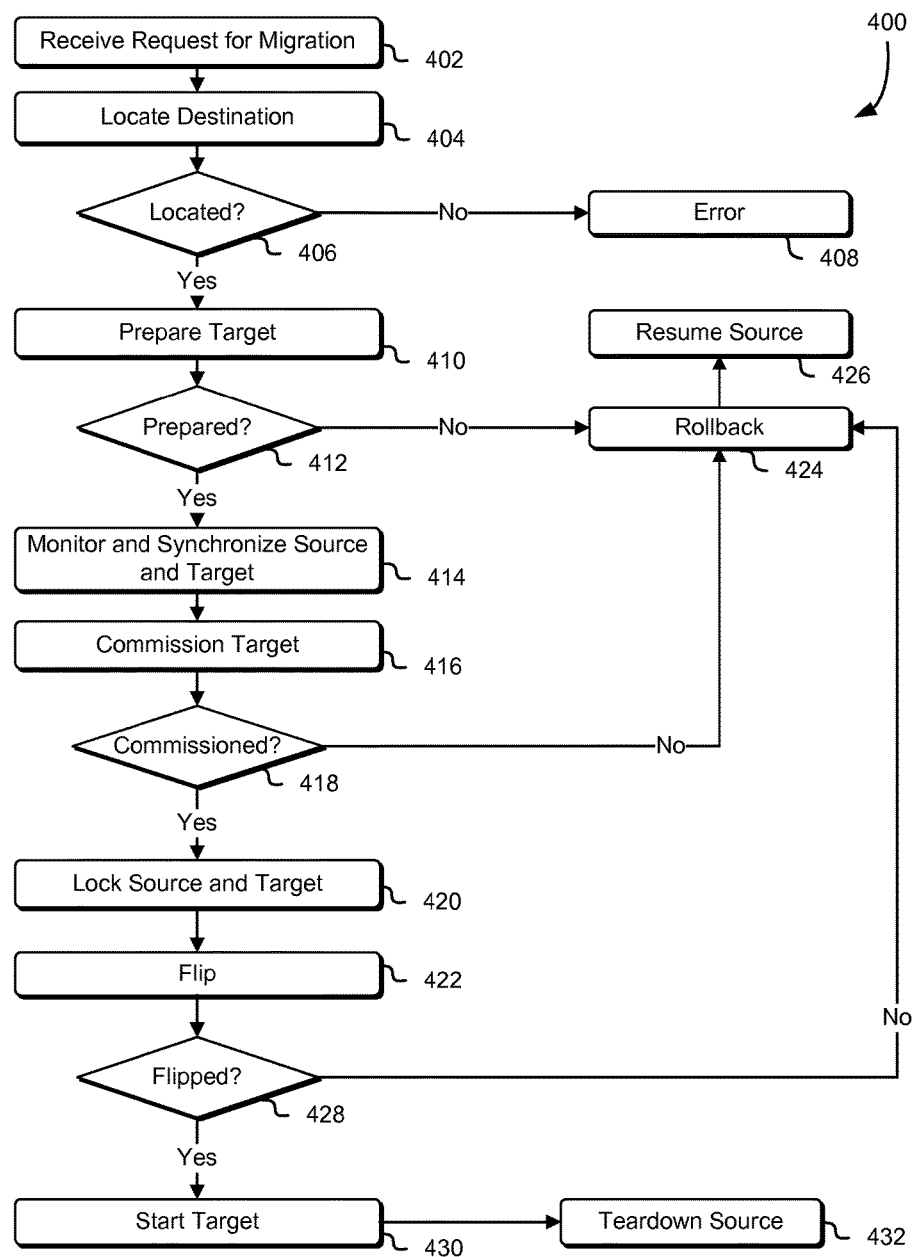
FIG. 4 illustrates an example process for managing the phases of a virtual machine instance migration.

FIG. 4 illustrates an example process 400 for managing the phases of a virtual machine instance migration as described in FIG. 1 and in accordance with at least one embodiment. A migration manager, such as the migration manager 104 described in connection with FIG. 1, may perform at least a part of the process illustrated in FIG. 4. A system manager, such as the system manager 108 described in connection with FIG. 1, may also perform at least a part of the process illustrated in FIG. 4.

A migration manager may first receive a request to perform a migration 402 of a virtual machine instance. The migration manager may then locate a target 404 to which the virtual machine instance may be migrated. The migration manager may locate the target based on resource availability, proximity to a customer, proximity to system resources, resource cost, or other such considerations. In an embodiment, a representation of the desired capabilities can be generated as, for example, a hash representation of the parameters of the desired capabilities. These parameters may include the size of the virtual machine instance, the type of processor or processors needed, the amount of memory, an operating system version, and/or software versions desired. The desired capabilities may be communicated to a virtual machine service using one or more API requests, or may be communicated to a virtual machine service as a set (i.e., in bulk or batches).

The migration manager may also direct the system manager to locate a target 404 to which the virtual machine instance may be migrated. The migration manager and/or the system manager may also direct a third system or service to locate a target 404 to which the virtual machine instance may be migrated. For example, the migration manager may generate a request for a target based on the desired capabilities of the target (e.g., type of CPU, type of hypervisor, installed software, associated hardware, etc.) and may send this request to the system manager. The system manager may then forward this request to a virtual machine service that may be configured to provide a set of one or more candidate targets in response to that request based on the desired capabilities. The system manager may then choose a subset of the set of one or more candidate targets and may provide that subset to the migration manager. As may be contemplated, the methods and systems for locating a target to which the virtual machine instance may be migrated that are described herein are merely illustrative examples, and other methods and systems for locating a target to which the virtual machine instance may be migrated may be considered as within the scope of this disclosure.

If it is not the case that a target is located 406, then the migration manager may generate an error 408 and send it to the requester of the migration. In addition to generating an error 408, the migration manager may also queue the request for migration for later processing. If is the case that a target is located 406, the migration manager may begin to prepare the target 410. The migration manager may begin to prepare the target 410 by, for example, generating one or more API requests to the target to reserve and/or create a location for the virtual machine instance (the location may also be referred to herein as a "slot") to reserve hardware and/or other resources associated with the virtual machine instance, and/or to instantiate a base virtual machine instance that may be used to migrate the virtual machine instance.

While it is not shown in the process illustrated in FIG. 4, the migration manager may determine to cancel the migration at several points during the process. For example, while the migration continues to prepare the target 410, the migration manager may determine that the migration is not likely to succeed as described above. At this determination, the migration manager may cancel the migration and perform any rollback necessary to return the system to a known state. Similarly, the migration manager may determine to cancel the migration if part of the process of preparing the target 410 takes too long, or if maintaining the synchronization between the virtual machine instance at the source and the virtual machine instance at the target becomes too costly. The migration manager may also cancel the migration at other steps of the process illustrated in FIG. 4 such as, for example, before the lock of the source, during the lock of the source, during the commission of the target location, during the flip from the source to the target, or after the flip from the source to the target has completed.

If it is not the case that the target is prepared 412, the migration manager may begin a rollback 424 and, after the rollback may resume the virtual machine instance at the source 426. In addition to performing the rollback and restore operations, the migration manager may also queue the request for migration for later processing. If is the case that the target is prepared 412, the migration manager may then begin monitoring and synchronizing the source and target 414 as described herein.

The migration manager may then commission the VM instance in the target location 416 (also referred to herein simply as "commission the target location"). The migration manager may commission the VM instance in the target location by performing a process or workflow comprising a set of operations that prepare the target location to load an image of the virtual machine instance and to execute the virtual machine image. The migration manager may also perform additional operations associated with the commission of the target location 416 (e.g., in addition to those described herein) including, but not limited to, provisioning the VM instance, attaching resources to the VM instance, verifying the VM instance, or executing one or more additional processes using the VM instance after the VM instance is executing.

The migration manager may commission the target location 416 by, for example, verifying the target, creating interfaces for the virtual machine instance at the target, attaching storage and network resources to virtual machine instance at the target, associating credentials with the virtual machine instance at the target, launching the virtual machine instance at the target, and beginning the process of copying memory and state from the virtual instance at the source to the virtual machine instance at the target. This copying of memory and state from the virtual machine instance at the source to the virtual machine instance at the target may be performed while the virtual machine instance at the source is still running. This may require the migration manager to also track changes made to the virtual machine instance at the source and to propagate those changes to the virtual machine instance at the target during and/or after the copy.

In an embodiment, the migration manager will commission the target location 416 by providing packet forwarding from the source to the target. This packet forwarding will allow the virtual machine instance at the source to continue receiving data packets from services and/or resources and to forward those data packets to the virtual machine instance at the target. This packet forwarding may also allow both virtual machine instances to send and receive data on behalf of the other, thereby retaining connections with the external services and/or resources associated with the virtual machine instances during the migration. For example, an I/O request from the virtual machine instance at the source to a block storage service may receive a response to that request during migration. The response may be received at the virtual machine instance at the source and then forwarded to the virtual machine instance at the target. Further actions based on that response may be performed by the source or may be performed by the target purporting to the source (i.e., so that an error is not generated). Such packet forwarding may continue throughout the migration.

The migration manager may determine that the process to commission the target location 416 has completed after one or more conditions are met. For example, when all API requests associated with the process to commission the target location 416 have been issued, all responses have been received from the services and/or resources, and no further data is expected. In an embodiment, the migration manager will wait for one or more systems to reach a known state (also referred to herein as "converging") before determining that the process to commission the target location 416 has completed. The migration manager may also determine that the process to commission the target location 416 has completed if there is an error, or if there is a timeout, or if it becomes apparent that the migration will not succeed.

Upon completion of the process to commission the target location 416, if the process has not completed successfully 418, the migration manager may begin a rollback 424 and, after the rollback may resume the virtual machine instance at the source 426. In addition to generating an error 408, the migration manager may also queue the request for migration for later processing as described above. Conversely, upon completion of the process to commission the target location 416, if the process has completed successfully 418, the migration manager may proceed to the lock of the source and target 420 by, for example, locking a virtual machine abstraction associated with the migration.

When the migration manager locks the virtual machine instance 414 at the source and the virtual machine instance at the target by locking a virtual machine abstraction, this lock to the virtual machine instances may prevent any entity from performing any actions on the virtual machine instances that may substantially alter the virtual machine instance (also referred to herein as "mutating" the virtual machine instance). Examples of operations that may be prevented by the lock are adding storage volumes to the virtual machine instance, changing the network interface of the virtual machine instance, stopping the virtual machine instance, or other such actions. The lock may prevent all such actions or may prevent some and allow others. The lock may also generate warnings and/or errors to the user so that the user may determine whether to override (or ignore) the lock.

After the lock, the migration manager may then proceed to the flip 422. Although not illustrated in FIG. 4, the migration manager may perform one or more operations prior to the flip 422 to begin cleanup after the migration. For example, in the event that the migration will not complete successfully (e.g., failing either at the prepare phase or at the commission phase), the migration manager may have completed a number of operations associated with the migration. To facilitate cleanup, the migration manager may store a stack of operations performed, so that the stack of operations may be used in the subsequent cleanup. Similarly, the migration manager may perform steps during the migration to cleanup certain operations if, for example, the changes associated with those operations are no longer required for the migration. Such operations that may be cleaned early may include temporary storage of files, temporary access to resource, or other such operations. It should be noted that the stack of operations that occur during the migration grows as the migration progresses so that, at the flip 422, the amount and complexity of the operations that may need to be rolled back in the rollback 424 may be the largest and/or the most complex.

In an embodiment, the migration manager will lock the source and target virtual machine instances at an earlier time such as, for example, before the commission of the target location 416. In another embodiment, the migration manager will delay the lock of the source and target virtual machine instances as late as possible in the migration process, and wait until after the commission of the target location 416, or delay until after the flip 422 has begun. This delayed locking (also referred to herein as "optimistic" locking) minimizes the time that a user may be unable to interact with a virtual machine instance that has been selected for migration by keeping the virtual machine unlocked during the commission phase.

Optimistic locking, described in detail below, may be accomplished by categorizing changes that may be received at the running virtual machine instance into whether or not they introduce changes, whether those changes are changes to the user visible abstraction of the virtual machine instance or to the domain (i.e., the actual virtual machine instance as instantiated), and whether those changes can be blocked by the migration manager. Each time changes are received that change the virtual machine instance, a version number for the virtual machine instance is incremented. Each time changes are received that change the domain, a version number for the domain may be incremented. If, during the migration, the version numbers diverge from where they were at the beginning of the migration, the migration manager may either attempt to synchronize the changes, block the changes to the source so that they may be applied to the target after migration, or cancel the migration. Version numbers are described in more detail below. In an embodiment, the migration manager will optimize for cancelling the migration, thus minimizing disruption of the customer experience.

As described above, if it is determined that, upon completion of the process to commission the target location 416, if the process has completed successfully 418, and the source and target are locked, the migration manager may proceed to the flip 422. The migration manager may perform one or more operations prior to the flip 422 such as, for example, verifying that a substantial portion of the memory and/or state has been copied from the virtual machine instance at the source to the virtual machine instance at the target, verifying all interfaces and resources are correctly attached to the virtual machine instances, verifying that the remaining memory and/or state changes are sufficiently minor as to be quickly propagated to the virtual machine instance at the target, and readying any resources for the final transition from the virtual machine instance at the source to the virtual machine instance at the target.

After the flip 422, the migration manager may then determine whether the virtual machine instance was successfully flipped 428 from the source to the target. The virtual machine instance was successfully flipped 428 from the source to the target if the memory and/or state (collectively referred to herein as the "instance state") of the virtual machine instance at the target is sufficiently the same as the instance state of virtual machine instance at the source, such that difference between the instance state of the virtual machine instance at the target and the instance state of the virtual machine instance at the target is less than a threshold value. The difference between the instance state of the virtual machine instance at the target and the instance state of the virtual machine instance at the target may be determined by, for example, computing a hash value of one or more parameters specified within the respective instance states and comparing those hash values.

If it is not the case that the virtual machine instance was successfully flipped 428 from the source to the target, the migration manager may perform one or more operations to rollback 424 the migration as described herein, and may resume the virtual machine instance at the source 426 so that the virtual machine instance at the source may continue to operate. If it is not the case that the virtual machine instance was successfully flipped 428 from the source to the target, the migration manager may also generate an error such as the error 408 as described above and send it to the requester of the migration. In addition to generating an error, the migration manager may also queue the request for migration for later processing.

If it is the case that the virtual machine instance was successfully flipped 428 from the source to the target, the migration manager may start the virtual machine instance at the target 430 and may complete the teardown of the source 432 as described herein, so that the virtual machine instance at the target may operate in place of the virtual machine instance at the source, thus completing the successful migration. In an embodiment, the migration manager will unlock the virtual machine instance at the source prior to the teardown of the source 432 to allow any blocked or pending mutating changes to proceed. These blocked or pending mutating changes may also be propagated to the virtual machine instance at the target via the packet forwarding. The teardown of the source 432 may remove duplicate network mapping, may remove redundant block storage connections, and may terminate connections with other services and/or resources. The migration manager may ensure that all connections have converged (i.e., reached a known good state) prior to the teardown of the source 432.

Figure 5:
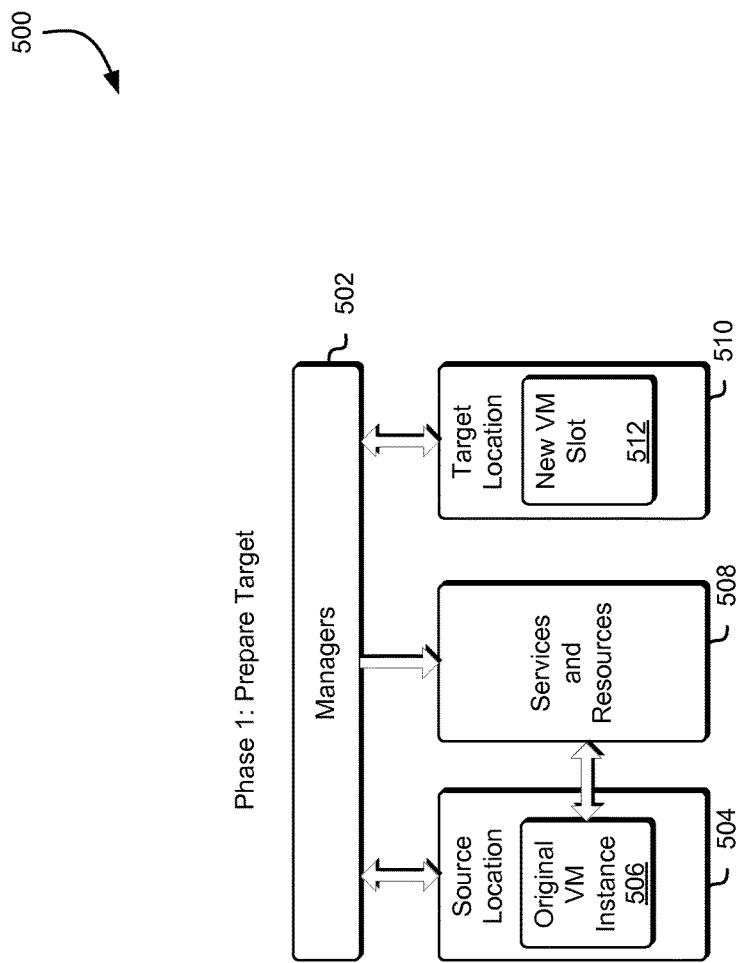
FIG. 5 illustrates an example environment where the first phase of a virtual machine instance migration is presented.

FIG. 5 illustrates an example environment 500 where the first phase of a virtual machine instance migration is presented as described in FIG. 1 and in accordance with at least one embodiment. The first phase illustrated in FIG. 5 is the prepare phase, where managers 502 such as the migration manager 104 and the system manager 108 described in connection with FIG. 1 prepare the target location to receive the migrated virtual machine instance. In the prepare phase, the original VM instance 506 is running at the source location 504 with access to one or more services and resources 508 as described herein. Connections between the original VM instance 506 and the services and resources 508 may include connections to block storage devices provided by a block storage service, connections to a network via a network interface, connections to a redundant storage service, or other such connections. The connections may be assigned to the virtual machine instance during the life of the virtual machine instance or may be temporarily provided to the virtual machine instance (e.g., may be "leased") and managed by a service such as a block storage service. During the prepare phase, the managers 502 may locate a target location 510 based on desired capabilities and also based on these connections to the services and resources and may create a new VM slot 512 at the target location 510. The target location 510 may be selected based on the desired capabilities as described above.

Figure 6:
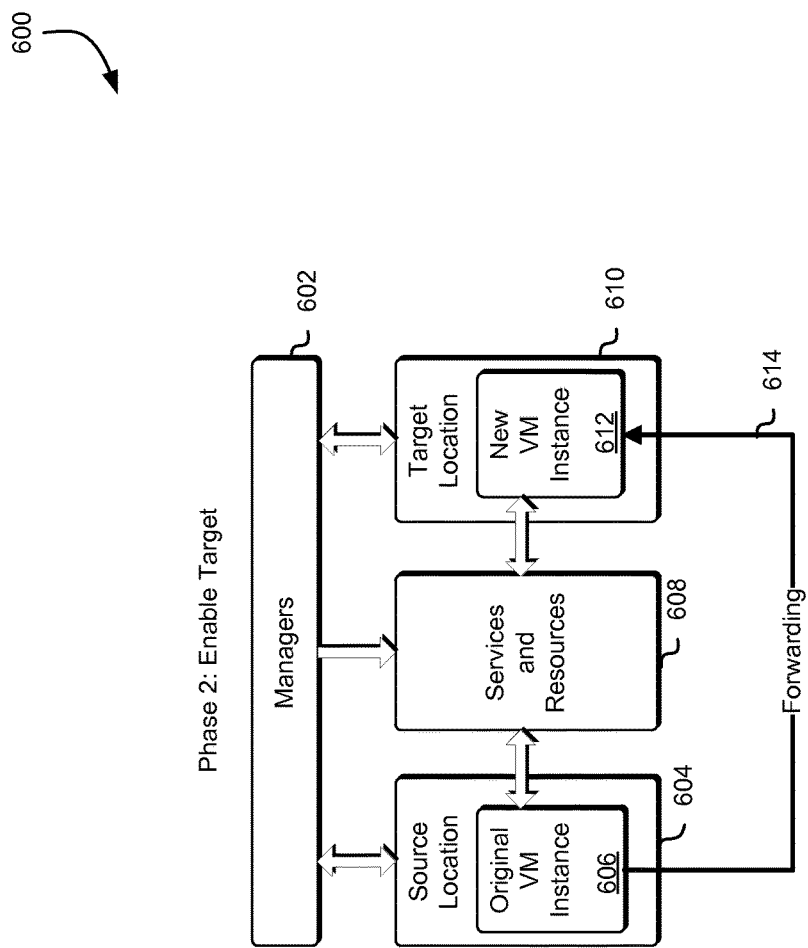
FIG. 6 illustrates an example environment where the second phase of a virtual machine instance migration is presented.

FIG. 6 illustrates an example environment 600 where the second phase of a virtual machine instance migration is presented as described in FIG. 1 and in accordance with at least one embodiment. The second phase illustrated in FIG. 6 is the commission phase, where managers 602 such as the migration manager 104 and the system manager 108 described in connection with FIG. 1 commission the virtual machine instance at the target location and copy memory and/or state from the virtual machine instance at the source to the virtual machine instance at the target. In the commission phase, the original VM instance 606 is running at the source location 604 with access to one or more services and resources 608 as described herein. During the commission phase, the managers 602 may perform operations so that the new VM instance 612 at the target location 610 may acquire access to one or more of the services and resources 608 associated with the original VM instance 606 at the source location 604. During the commission phase, the managers 602 may also cause memory and/or state to be copied from the original VM instance 606 at the source location 604 to the new VM instance 612 at the target location 610 and may also configure the original VM instance 606 at the source location 604 to forward packets to the new VM instance 612 at the target location 610.

This forwarding 614 from the original VM instance 606 at the source location 604 to the new VM instance 612 at the target location 610 may proceed throughout the process to commission the target. This forwarding 614 from the from the original VM instance 606 at the source location 604 to the new VM instance 612 at the target location 610 is so that the new VM instance 612 may become congruent with (also referred to herein as becoming "aligned" with or as "converging" with) the original VM instance 606. In an embodiment, the convergence of the new VM instance 612 with the original VM instance 606 is a condition for the completion of the commission phase of the migration (i.e., the commission phase does not complete until the virtual machines converge). Note that in the example illustrated in FIG. 6, the original VM instance 606 at the source location 604 and the new VM instance 612 at the target location 610 are not locked, illustrating an example of optimistic locking or of delaying the lock until the flip phase.

Figure 7:
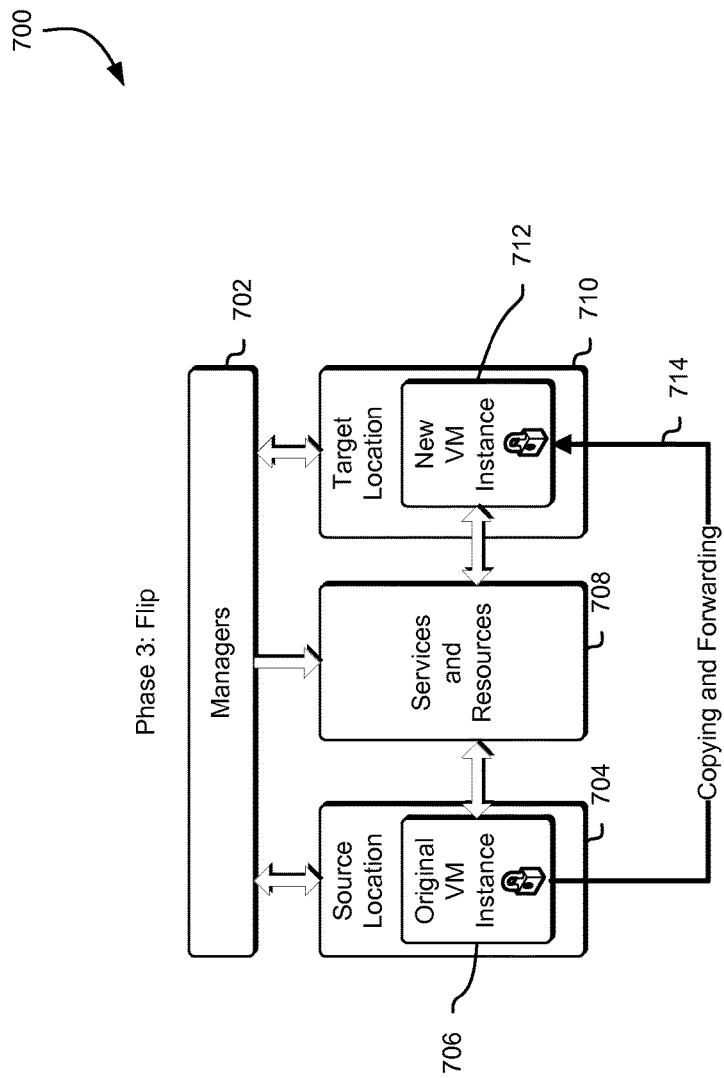
FIG. 7 illustrates an example environment where the third phase of a virtual machine instance migration is presented.

FIG. 7 illustrates an example environment 700 where the third phase of a virtual machine instance migration is presented as described in FIG. 1 and in accordance with at least one embodiment. The third phase illustrated in FIG. 7 is the flip phase, where managers 702 such as the migration manager 104 and the system manager 108 described in connection with FIG. 1 complete the migration of the virtual machine instance at the source to the virtual machine instance at the target. In the flip phase, the original VM instance 706 is running at the source location 704 with access to one or more services and resources 708 as described herein, but both the original VM instance 706 and the new VM instance 712 may be locked so that any mutating changes to the original VM instance 706 are blocked until the migration has completed. Additionally, both the original VM instance 706 and the new VM instance 712 may be paused or locked, to further ensure that there are no mutating changes to either VM instance. In this phase, the copying and forwarding 714 of packets from the original VM instance 706 at the source location 704 to the new VM instance 712 at the target location 710 may continue as mutating changes prior to the lock continue to converge.

Figure 8:
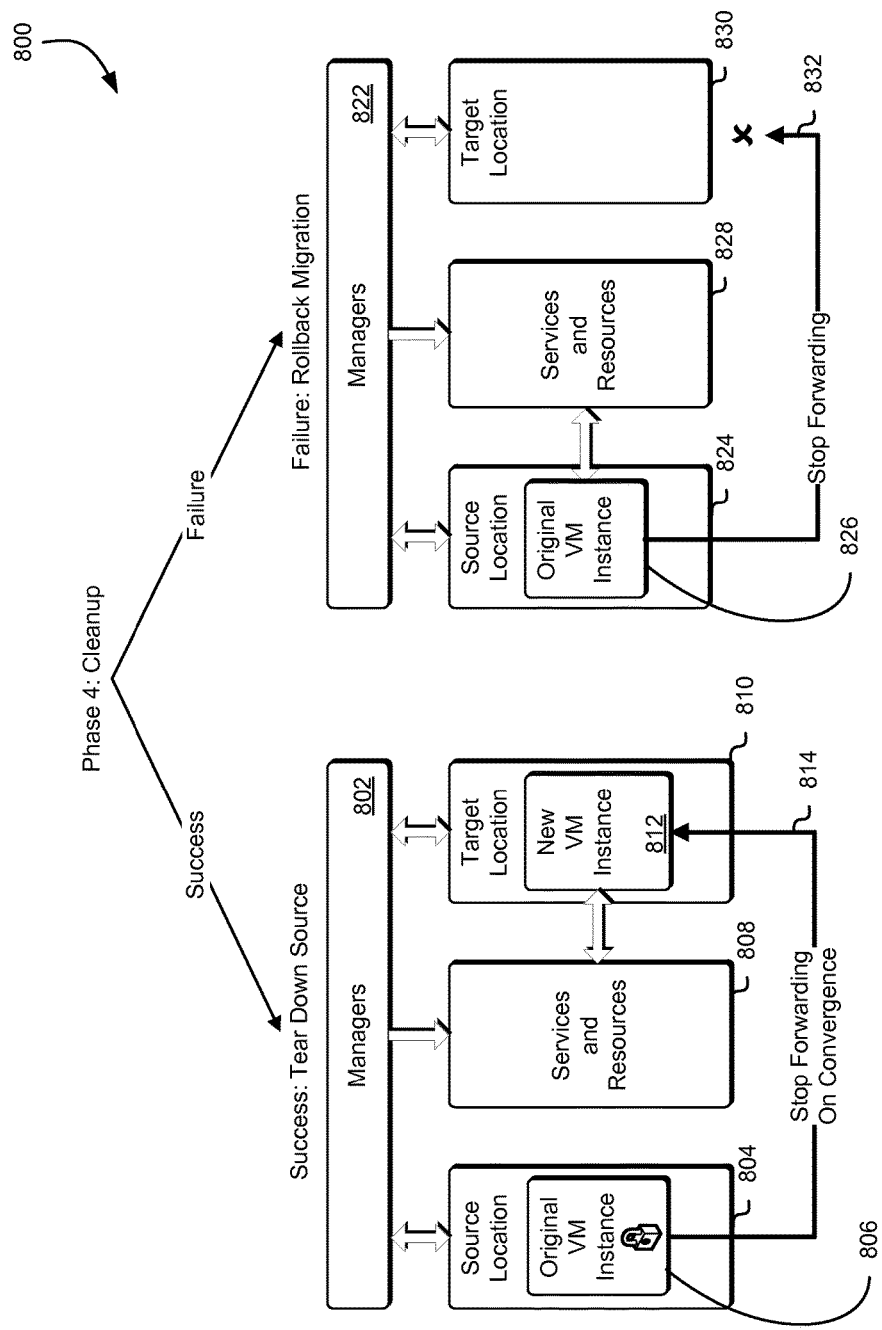
FIG. 8 illustrates an example environment where the fourth phase of a virtual machine instance migration is presented.

FIG. 8 illustrates an example environment 800 where the fourth phase of a virtual machine instance migration is presented as described in FIG. 1 and in accordance with at least one embodiment. The fourth phase illustrated in FIG. 8 is the cleanup phase, where managers 802 such as the migration manager 104 and the system manager 108 described in connection with FIG. 1 perform any final steps of the migration of the virtual machine instance at the source to the virtual machine instance at the target, depending on whether the flip was successful or a failure.

For a successful flip, the managers 802 may tear down the original VM instance 806 at the source location 804, removing access to services and resources 808. The packet forwarding may continue, but may stop on convergence of the target location 814. Meanwhile, the new VM instance 812 at the target location 814 may replace the original VM instance 806 at the source location 804 with access to the services and resources 808 formerly associated with the original VM instance 806 at the source location 804. For an unsuccessful flip (e.g., due to a failure or a cancellation), the managers 802 may rollback the migration by unlocking the original VM instance 826 at the source location 824, may remove the new VM instance at the target location 830, and may stop packet forwarding 832 from the original VM instance 826.

One or more operations associated with the services and resources 828 may also be performed such as, for example, removing redundant connections and/or interfaces.

Figure 9:
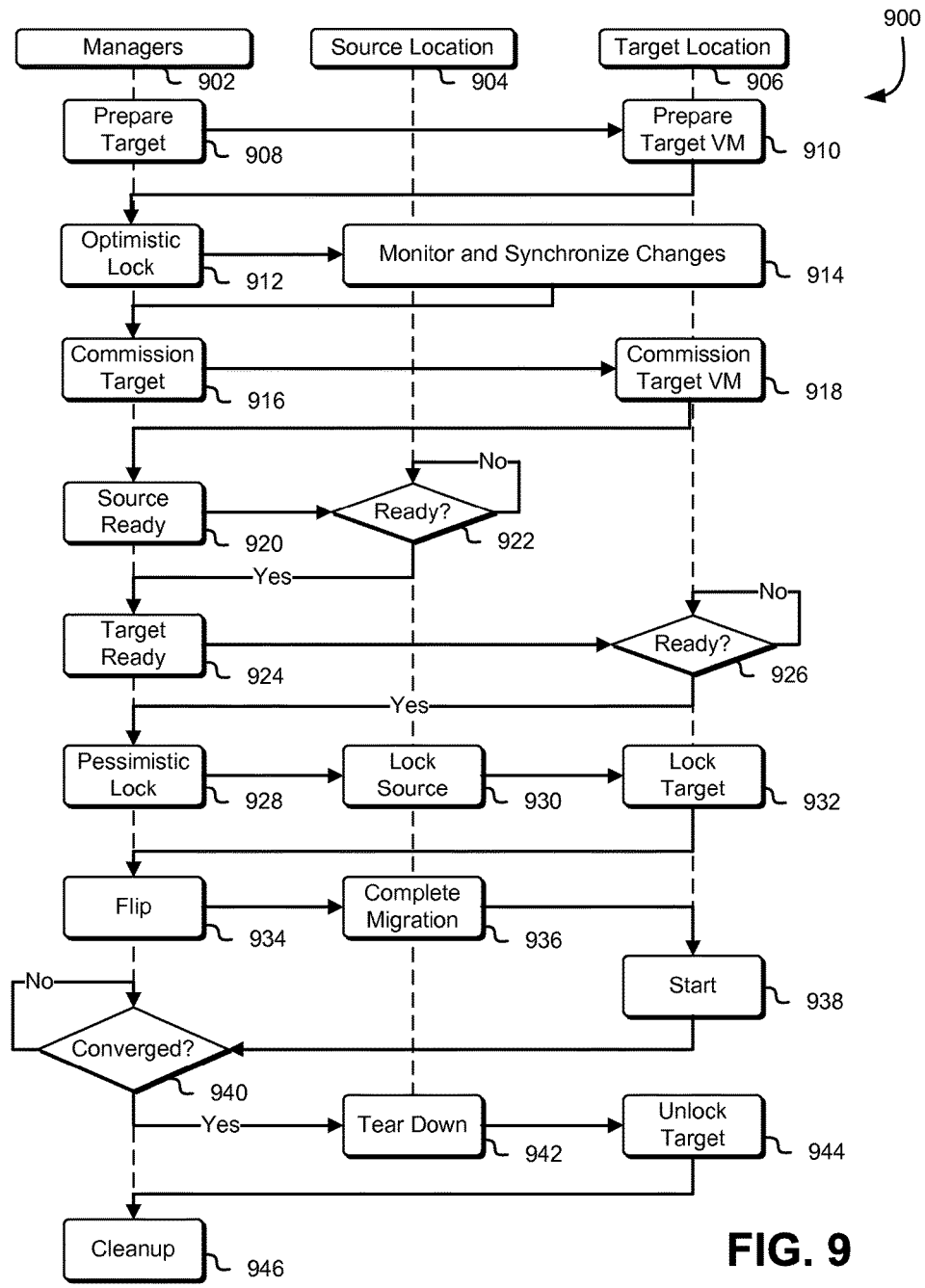
FIG. 9 illustrates an example diagram showing the phases of a virtual machine instance migration.

FIG. 9 illustrates an example diagram 900 showing the phases of a virtual machine instance migration as described in FIG. 1 and in accordance with at least one embodiment. Managers 902, such as the migration manager 104 and the system manager 108 described in connection with FIG. 1, may generate a command to prepare a target 908 to receive the migrated virtual machine instance, as described herein in connection with FIG. 5. The command may be sent to the target location 906 where operations to prepare the target VM 910 may be performed. If the command to prepare the target VM 910 is successful, the managers 902 may then start the optimistic lock 912 of the source and target. The optimistic lock 912 of the source and target includes operations to monitor and synchronize changes 914 so that mutating changes made to the source VM are propagated to the target VM as described herein. The operations to monitor and synchronize changes 914 may continue until the flip begins, as described below.

After the optimistic lock 912, the managers 902 may then generate commands to commission the target 916. The commands may be sent to the target location 906 as illustrated in FIG. 9. The commands may also be sent to a source location 904 and/or to one or more services or resources as described herein. In response to the commands to commission the target 916, the target location may commission the target VM 918 as described herein.

The command to prepare the target 908 and/or the commands to commission the target 918 may include a version number of the virtual machine instance that will be migrated from the source location 904. This version number of the of the virtual machine instance that will be migrated from the source location 904 may be obtained by the managers 902 by querying the source location. The managers 902 may query the source location 904 and/or the target location 906 for version numbers. These version numbers may be used by the managers 902 to determine readiness and/or convergence as described below.

The managers 902 may then determine whether the source is ready 922. The managers 902 may wait for the source location 904 to indicate that it is ready for migration 924. The managers 902 may wait indefinitely, or may wait until a condition occurs, or may wait until a timeout expires, or may wait until a number of iterations have occurred. If the source location 904 does not indicate that it is ready for migration 924, the managers 902 may issue an error or alarm, initiate error handling, or begin some other action in response. Although not illustrated in FIG. 9, if the source location 904 does not indicate that it is ready for migration 924, the migration may be cancelled. The managers 902 may then determine whether the target is ready for migration 926. Readiness of the target for migration may be predicated on the completion of the commissioning of the target VM for migration when, for example, the state of the target location 906 converges to the state of the source location 904. Again the managers 902 may wait for the target location 906 to indicate that it is ready for migration 926 indefinitely, or until a condition occurs, or until a timeout expires and, as with the source location, the managers 902 may perform one or more error handling operations. Additionally, the migration may be cancelled if the target location does not indicate that it is ready for migration 926. The managers 902 may compare version numbers received as part of a readiness response from the source and/or from the target to some known or determined target version number to verify readiness.

Once both the source location 904 and the target location 906 are ready for migration, the managers generate a command to do the pessimistic lock 928 on the source and the target virtual machine instances. The pessimistic lock 928 is the final locking of the source 930 and the final locking of the target 932 to prevent any mutating changes during the critical flip phase of the migration. Once the source virtual machine instance and the target virtual machine instance are locked, the managers 902 may then initiate the flip 934, which may cause the source location 904 to complete the migration 936 of the virtual machine instance to the target location 906, and may cause the target location 906 to enable the virtual machine instance at the target location 906 by starting 938 the virtual machine instance at the target location 906. It should be noted that the diagram illustrated in FIG. 9 does not include the failure of the flip, which is described in more detail herein.

Finally, the managers may wait until all memory and/or states have converged 940 and the migration is completed and/or until version numbers have reached a determined state before tearing down the virtual machine instance 942 at the source location 904 (including releasing the lock), unlocking 944 the target location 906, and completing any remaining cleanup 946 of the migration.

Figure 10:
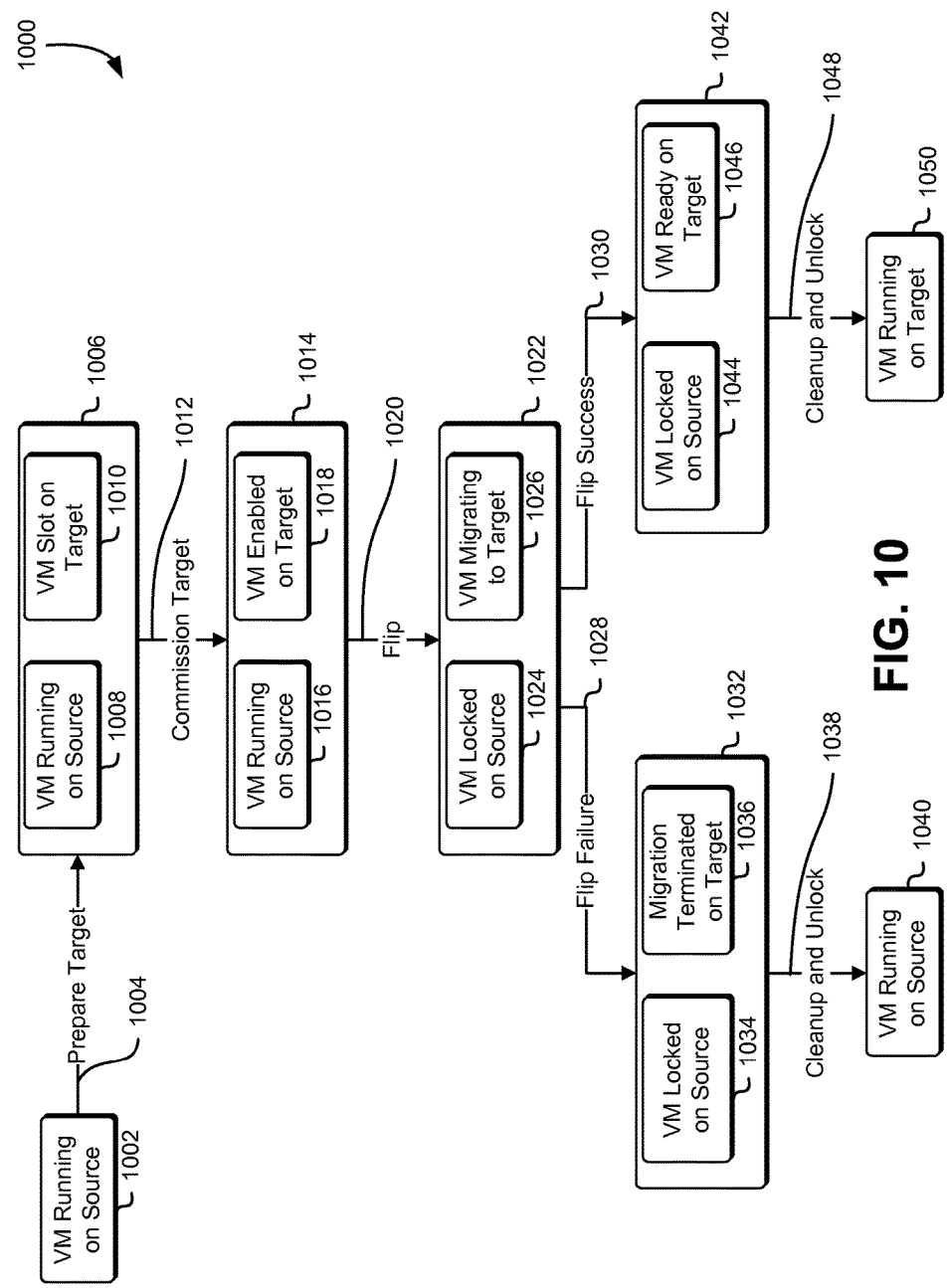
FIG. 10 illustrates an example state diagram showing the state changes of a virtual machine instance migration.

FIG. 10 illustrates an example state diagram 1000 showing the state changes of a virtual machine instance migration as described in FIG. 1 and in accordance with at least one embodiment. At the beginning of the virtual machine migration, a virtual machine instance may be running at the source location 1002 as described herein. When the migration enters its first phase, prepare target 1004, the system enters a next state 1006 with the virtual machine instance still running at the source location 1008 while a virtual machine slot is prepared at the target location 1010. When the migration enters its second phase, commission target 1012, the system enters a next state 1014 with the virtual machine instance still running at the source location 1016, while a virtual machine instance is commissioned at the target location 1018. In the commission phase, both the source and the target may be locked or one or both may have their locking delayed until later in the migration by using an optimistic locking technique. Note that in the diagram illustrated in FIG. 10, the lock has been delayed to as late as possible to reduce the potential impact of the migration. In this example, the last operation of the state 1014 would be to lock the virtual machine instance at the source location.

When the migration enters its third phase, flip 1020, the system enters a next state 1022 with the virtual machine instance locked at the source location 1024 while the virtual machine instance migration to the locked target location is completed 1026. Both virtual machine instances may be locked in the state 1022 by, for example, locking a virtual machine abstraction associated with the source virtual machine instance and the target virtual machine instance. In an embodiment, the source virtual machine instance and the target virtual machine instance are locked separately rather than by locking the virtual machine abstraction.

If the flip fails 1028, the system will next enter a failure state 1032 with the virtual machine instance locked at the source location 1034 while the locked virtual machine instance migration to the target location is terminated 1036. The system will next enter a final cleanup and unlock phase 1038, resulting in a virtual machine instance running on the source 1040, leaving the system just as it was before the migration was attempted. The failed migration may be attempted later.

If the flip succeeds 1030, the system will next enter a success state 1042 with the virtual machine instance locked at the source location 1044 while the locked virtual machine instance is ready at the target location 1046. The system will next enter a final cleanup and unlock phase 1048, resulting in a virtual machine instance running on the target 1050, and a successful migration.

Figure 11:
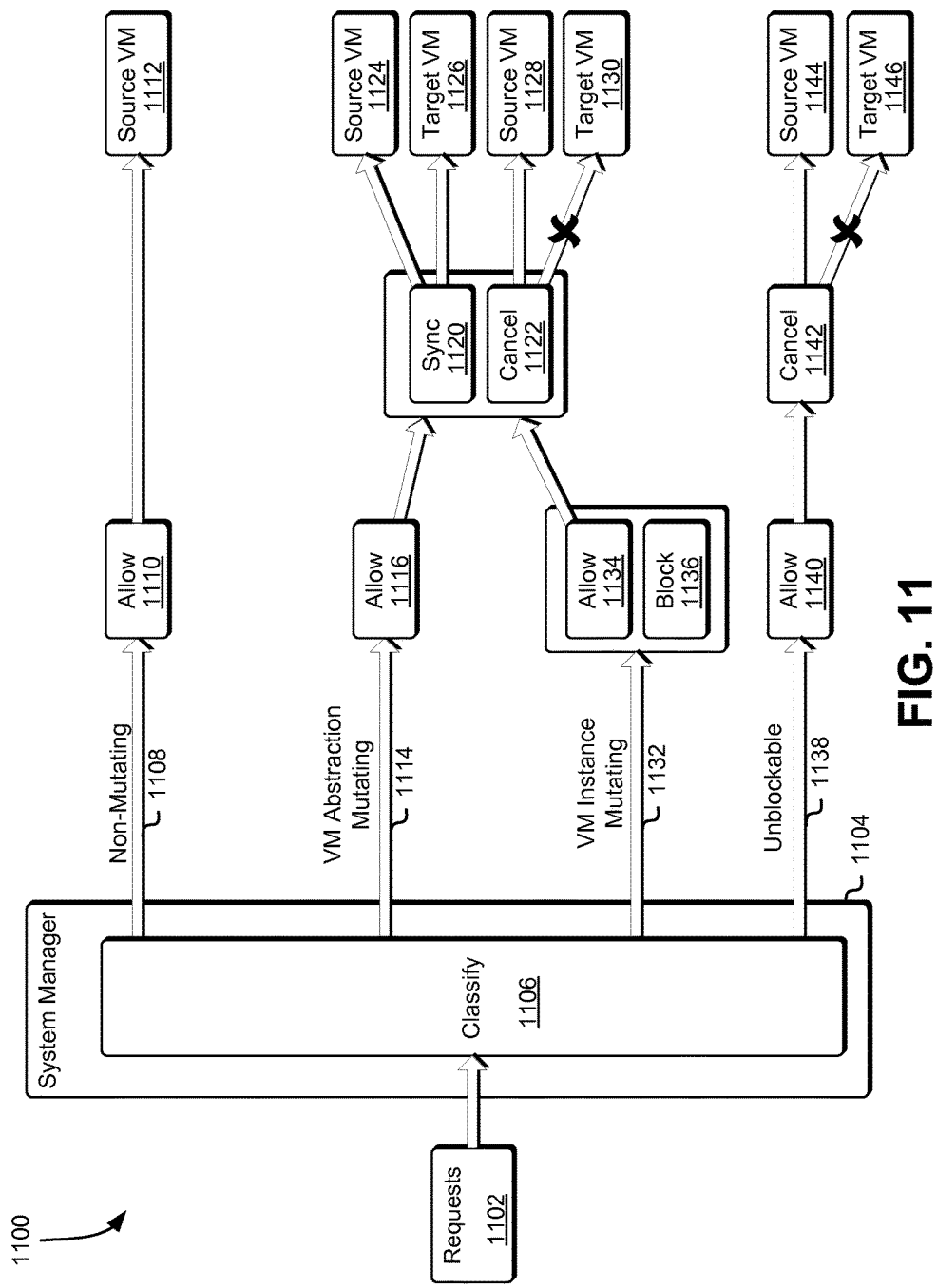
FIG. 11 illustrates an example environment where requests that may modify a migrating virtual machine instance are classified and processed to provide optimistic locking.

FIG. 11 illustrates an example environment 1100 where requests that may modify a migrating virtual machine instance are classified and processed as described in FIG. 1 and in accordance with at least one embodiment. Classifying and processing requests that may modify a migrating virtual machine instance during the migration may allow for optimistic locking, where the lock of the migrating virtual machine may be delayed as long as possible, thereby reducing the impact on a user as a result of the migration.

Requests 1102 may be received by a system manager 1104. The requests 1102 may include API requests, webservice requests, library requests, or some other type of request. The requests 1102 may be associated with a migration and may be received from a migration manager as described herein. The requests 1102 may also be independent of the migration and may, for example, be requests received by a virtual machine instance as a result of the operation of and/or interaction with the virtual machine instance. For example, a request from a user to establish a connection to a new block storage device provided by a block storage service may be independent of the migration. Requests which are independent of the migration may also be generated from within the virtual machine instance as described herein (e.g., a virtual machine instance may be running an operating system that may allow a user to directly mount a block storage device by logging into the virtual machine instance and directly issuing commands to establish a connection to a block storage device).

The requests 1102 may be sent to a virtual machine instance that may be in the process of being migrated as described herein. The requests 1102 may be sent to the virtual machine instance from the migration manager described herein. The requests 1102 may also be sent to the virtual machine instance from services and/or resources associated with the virtual machine instance. The requests 1102 may also be sent to the domain (i.e., the actual virtual machine instance) or to the host machine where that domain resides. The requests 1102 may also be in the form of responses to requests generated by the virtual machine instance (e.g., the virtual machine instance may have requested access to a resource and the call may be generated based on that request).

The requests 1102 may be classified 1106 by the system manager 1104 as to whether they are non-mutating 1108, VM abstraction mutating 1114, VM instance mutating 1132, or unblockable 1138. Requests 1102 may be classified 1106 by the system manager 1104 according to a categorization of a request type associated with the request. For example, the system manager 1104 may categorize requests by request types such as "get" requests (e.g., requests that retrieve data from resources), "put" requests (e.g., requests that send data to resources), and "describe" requests (e.g., requests that describe resources). Each request may be considered an instance of a request type according to the categorization and classified according to that request type. For example, requests that are categorized as the "put" request type may be mutating requests, requests that are categorized as the "describe" request type may be non-mutating requests, and requests that are categorized as the "get" request type may be non-mutating. When the request is an application programming interface request, the application programming interface request may be classified by an application programming interface request type such as, for example, get or put requests. Each application programming interface request may also be considered an instance of an application programming interface request type.

As described above, requests that are non-mutating 1108 are requests that do not cause any changes to the virtual machine instance or the user visible abstraction of that virtual machine instance. Requests that, for example, describe resources or provide other such information are non-mutating 1108. Requests that are non-mutating 1108 are always allowed 1110 and sent to the source VM (i.e., the virtual machine instance at the source location) for processing. A request received from a user or customer while that user or customer is interacting with a virtual machine may be referred to herein as a "customer-initiated request." An application programming interface request (or API request) received from the user or customer while that user or customer is interacting with a virtual machine may be referred to herein as a "customer-initiated application programming interface request" or as a "customer-initiated API request."

Requests that are VM abstraction mutating 1114 are requests that cause changes to the user visible abstraction of the virtual machine instance. A user visible abstraction of a virtual machine instance should remain invariant during migration. Before the migration, the user visible abstraction of the virtual machine instance is backed by the virtual machine instance at the source location. During the migration, the user visible abstraction of the virtual machine instance is also backed by the virtual machine instance at the source location although during the flip, the virtual machine instance at the source location (and thus the user visible abstraction of the virtual machine instance) may be locked. After a successful migration, the user visible abstraction of the virtual machine instance is backed by the virtual machine instance at the target location. After a failed or cancelled migration, the user visible abstraction of the virtual machine instance is backed by the virtual machine instance at the source location.

Requests that are VM abstraction mutating 1114 are requests that change the visible state of the virtual machine instance by, for example, pausing the virtual machine instance, stopping the virtual machine instance, or starting the virtual machine instance. Requests that change the state of a network interface or a storage volume are also VM abstraction mutating 1114. Requests that are VM abstraction mutating 1114 will cause the version number of the virtual machine instance to change. Requests that are VM abstraction mutating 1114 will generally cause corresponding changes to the virtual machine instance that is backing the VM abstraction. For example, a call that changes the state of a network interface in the user visible VM abstraction may also cause a corresponding change to be made to the virtual machine instance at the source location. Requests that are VM abstraction mutating 1114 may be allowed if, for example, the underlying instances are not locked during the flip.

When requests that are VM abstraction mutating 1114 are allowed 1116, an attempt may be made to synchronize 1120 the changes made by the call to both the source VM 1124 (i.e., the virtual machine instance at the source location) and the target VM 1126 (i.e., the virtual machine instance at the target location). For example, the packet forwarding described herein may be used to synchronize 1120 the source VM 1124 and the target VM 1126. Version numbers may be used to aid in this synchronization 1120. When requests that are VM abstraction mutating 1114 are allowed 1116, they may also cause the migration to be cancelled 1122. When the migration is cancelled 1122, the requests that are VM abstraction mutating 1114 and allowed 1116 may be sent to the source VM 1128, but not sent to the target VM 1130.

Requests that are VM abstraction mutating 1114 will always be blocked if the virtual machine instance is locked during the flip as described herein. Requests that are VM abstraction mutating 1114 and that are blocked may be rejected (e.g., have a rejection response sent), or they may be added to a request queue that contains an ordered list of pending requests for processing after the virtual machine instance lock is released. Although not illustrated in FIG. 11, requests that are VM abstraction mutating 1114 and that are blocked may also cause the migration to be cancelled as described herein if, for example, allowing such requests might cause the migration to become excessively complicated or might cause the migration to take too long.

Requests that are VM instance mutating 1132 are requests that cause changes to the source domain (i.e., the virtual machine instance at the source), but not to the user visible abstraction of the virtual machine instance. Such requests do not cause the virtual machine version number to change, but may cause a domain version number to change. Such requests may be generated with an expected or target virtual machine version number so that they can be allowed or rejected based on whether or not the domain changes are being made to the same virtual machine instance version as was intended. The inclusion of the virtual machine target version number in a call that is VM instance mutating may ensure that an alteration may not be made to a virtual machine instance where the user visible abstraction of the VM instance has changed. For example, a call that is VM instance mutating 1132 may be generated to make a change to a file backed by a block storage device provided by a block storage service. If the call specifies virtual machine target version number one, but when it is received, the virtual machine version number is two, the change in virtual machine version number may be a result of a VM abstraction mutating call that altered the availability of that block storage device. In an embodiment where the virtual machine target version number of the VM instance mutating requests is optional, VM instance mutating requests can be allowed while the virtual machine is not locked during migration and rejected when the virtual machine is locked during migration. A majority of the requests made by the migration manager are VM instance mutating 1132, rather than VM abstraction mutating.

As described above, requests that are VM instance mutating 1132 may be allowed 1134 or may be blocked 1136. Requests that are VM instance mutating 1132 and that are blocked 1136 may be rejected (e.g., have a rejection response sent), or they may be queued for processing after the virtual machine instance lock is released. Requests that are VM instance mutating 1132 and that are blocked 1136 may also cause the migration to be cancelled as described herein.

As with requests that are VM abstraction mutating 1114 and allowed 1116, when requests that are VM instance mutating 1132 are allowed 1134, an attempt may be made to synchronize 1120 the changes made by the call to both the source VM 1124 (i.e., the virtual machine instance at the source location) and the target VM 1126 (i.e., the virtual machine instance at the target location). When requests that are VM instance mutating 1132 are allowed 1134, they may also cause the migration to be cancelled 1122. When the migration is cancelled 1122, the requests that are VM instance mutating 1132 and allowed 1134 may be sent to the source VM 1128, but not sent to the target VM 1130.

Requests that are unblockable 1138 are mutating requests that may not be safely blocked because, for example, the system is configured to not allow blocking of such requests. Unblockable requests may cause a change in the virtual machine version number and may require special cleanup procedures by the migration manager. Requests that are unblockable 1138 may be allowed 1140, but may cause the migration to be cancelled 1142. The requests that are unblockable 1138 may then be sent to the source VM 1144, but not sent to the target VM 1146. Although not illustrated in FIG. 11, requests that are unblockable 1138 may also be allowed 1140, but may not cause the migration to be cancelled. For example, a call to halt a virtual machine instance that is issued from within the virtual machine instance (e.g., a Unix 'shutdown –h now' command) may be logged and, after the migration has completed, may be executed on the target domain (resulting in a successful migration and a shutdown).

Figure 12:
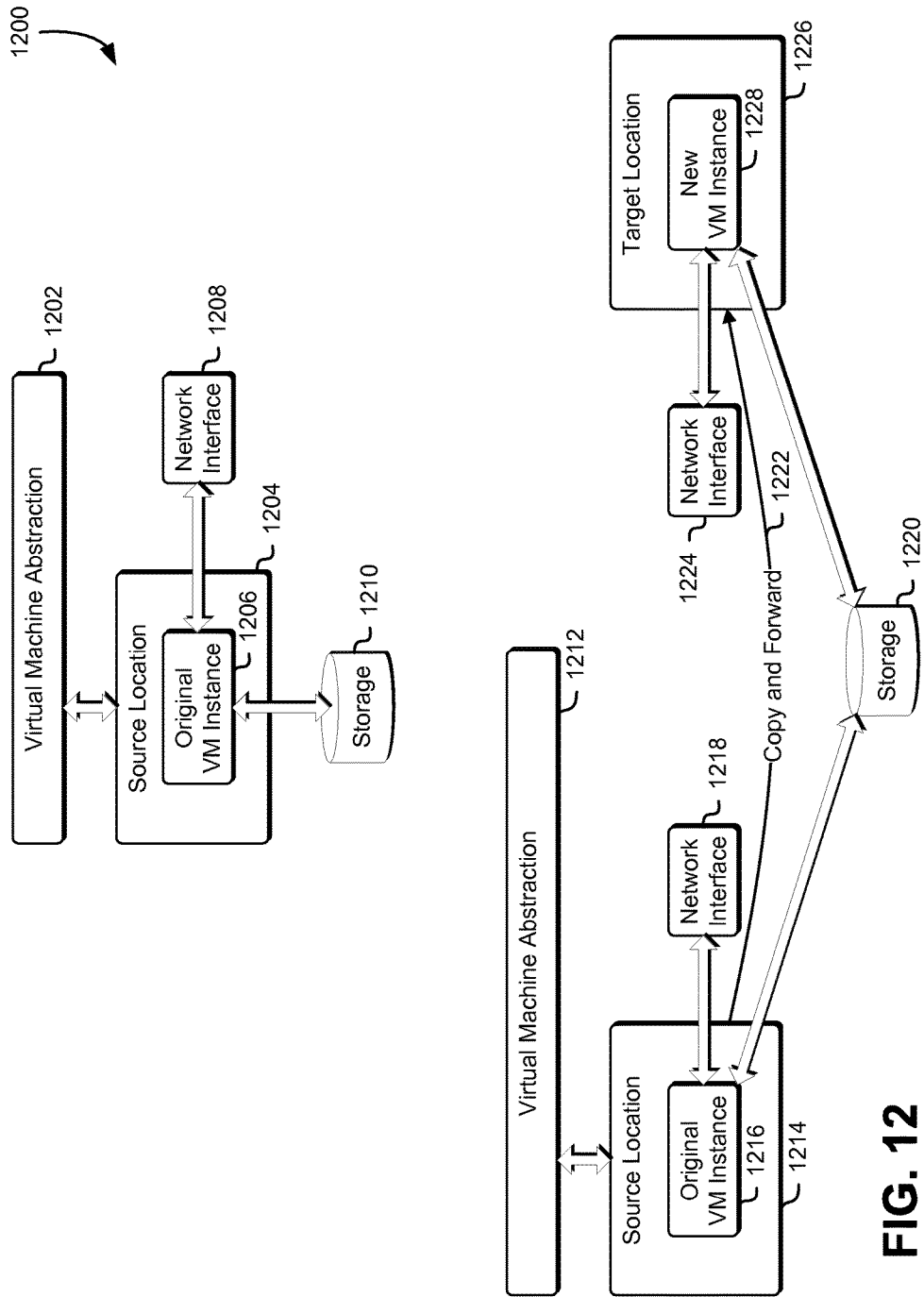
FIG. 12 illustrates an example environment where resources associated with a virtual machine instance migration are managed.

FIG. 12 illustrates an example environment 1200 where resources associated with a virtual machine instance migration are managed as described in FIG. 1 and in accordance with at least one embodiment. The example environment 1200 represents the first part of a migration, such as the migration described herein. A user may have access to a virtual machine abstraction 1202 backed by an original VM instance 1206 at a source location 1204. The original VM instance 1206 may include a network interface 1208 and one or more storage locations 1210. During migration, the user may have the same access to a virtual machine abstraction 1212 backed by the original VM instance 1216 at a source location 1214. The original VM instance 1216 may still include a network interface 1218 and one or more storage locations 1220, but the network interface 1218 may be shared with a new VM instance 1228 at a target location 1226 and/or may be duplicated as the network interface 1224.

The network interface 1218 and the network interface 1224 may be the same network interface from the perspective of the virtual machine abstraction and/or the user, and the migration manager may manage which is the active interface and which is the standby interface during the course of the migration. For example, prior to the flip, the network interface 1218 may be the active interface and the network interface 1224 may be the standby interface. After the flip, the network interface 1218 may be the standby interface and the network interface 1224 may be the active interface. Additionally, the one or more storage locations 1220 may be shared between the original VM instance 1216 and the new VM instance 1228. During migration, memory and/or state information may be copied and forwarded 1222 from the original VM instance 1216 to the new VM instance 1228 as described herein.

Figure 13:
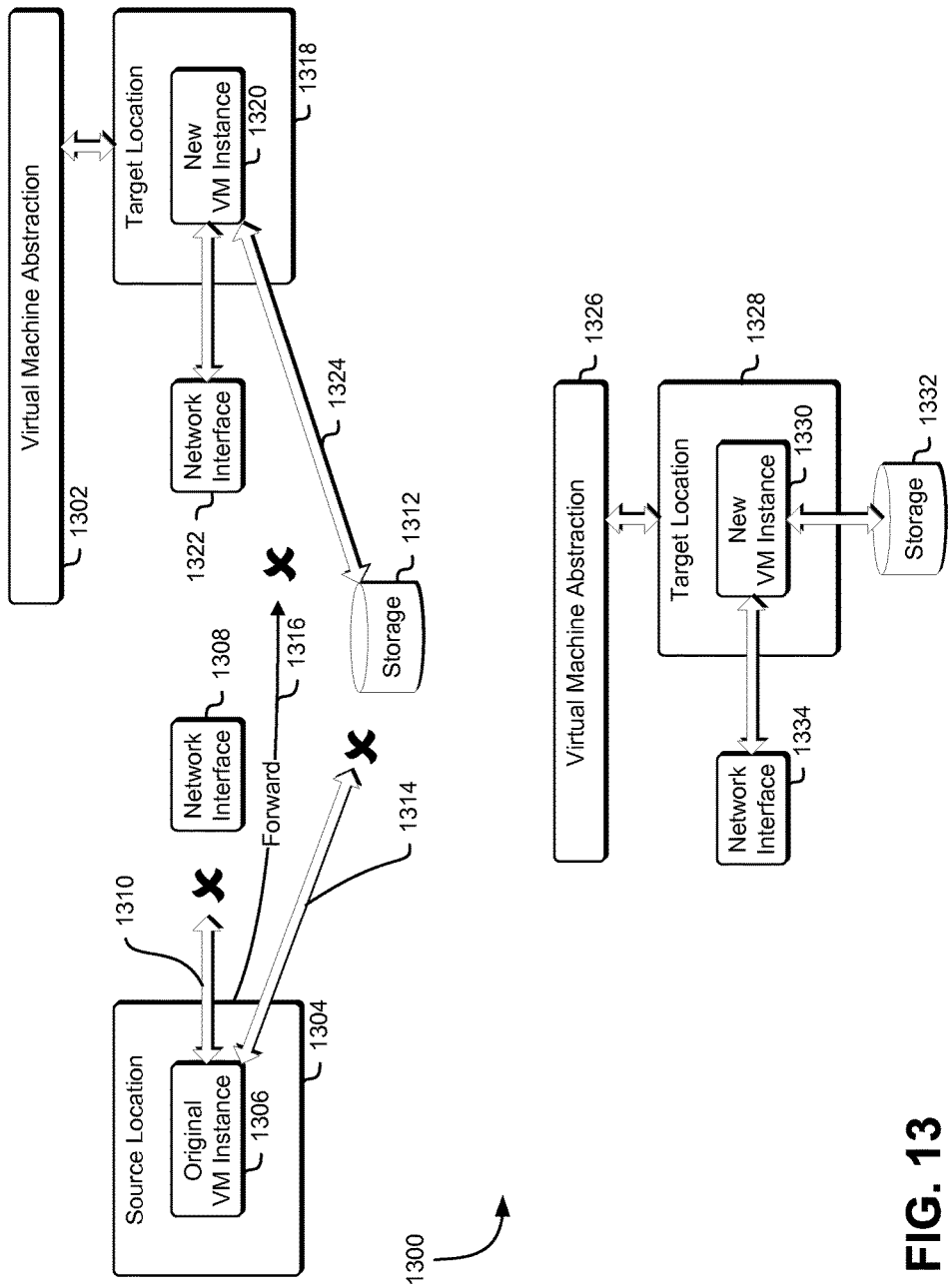
FIG. 13 illustrates an example environment where resources associated with a virtual machine instance migration are managed.

FIG. 13 illustrates an example environment 1300 where resources associated with a virtual machine instance migration are managed as described in FIG. 1 and in accordance with at least one embodiment. The example environment 1300 represents the second part of a migration such as the migrations described herein. A user may have access to a virtual machine abstraction 1302, but because the migration is reaching completion, the virtual machine abstraction 1302 may be backed by a new VM instance 1320 at a target location 1318. The new VM instance 1320 may have a network interface 1322 (which may be the same as the network interface 1308 as described above in connection with FIG. 12) and may have access 1324 to one or more storage locations 1312. The network interface 1308 may be the active network interface and the network interface 1322 may be the standby network interface. Meanwhile, the original VM instance 1306 at the source location 1304 may be in the process of being torn down. For example, the connection 1310 to the network interface 1308 may be terminated, the connection 1314 to the one or more storage locations 1312 may be removed, and the packet forwarding 1316 from the original VM instance to the new VM instance may be stopped after the original VM instance 1306 has converged.

After the successful migration, the user may have access to a virtual machine abstraction 1326 backed by the new VM instance 1330 at the target location 1328. Except for the different location, this new VM instance 1330 should appear to be the same as the original VM instance 1206 described in connection with FIG. 12, with a new active network interface 1334 and access to one or more storage locations 1332.

Figure 14:
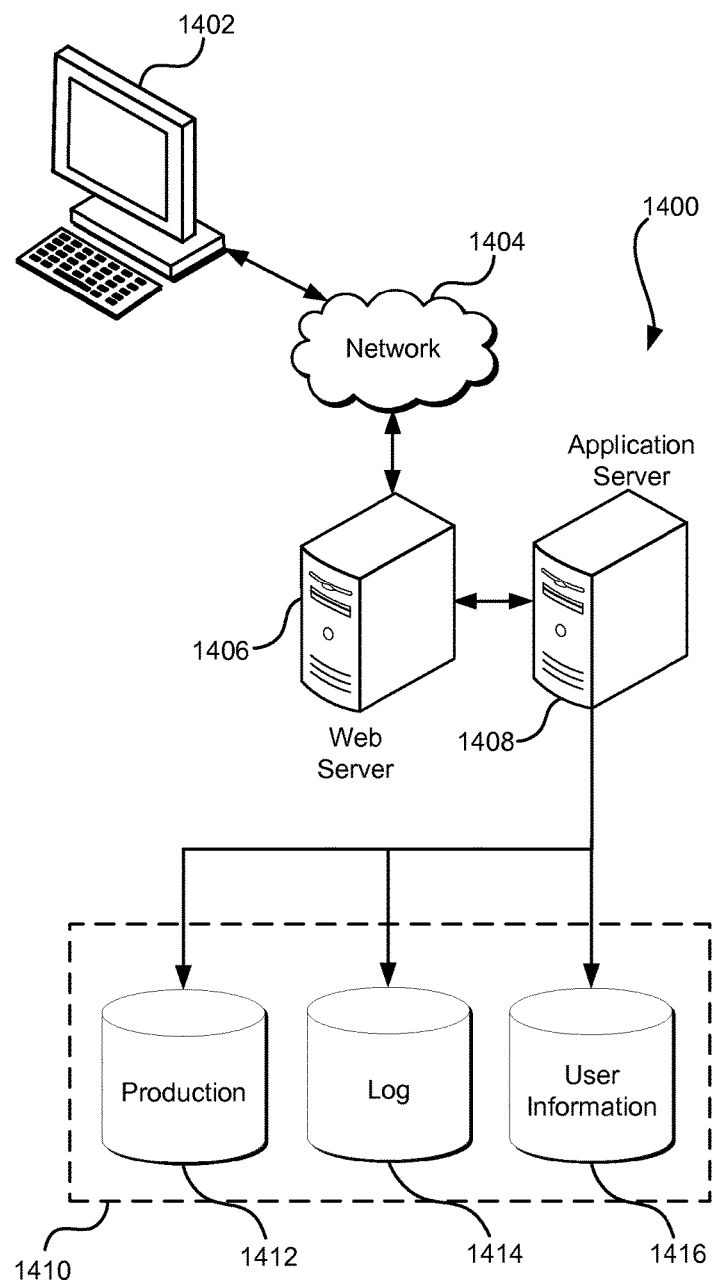
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system illustrated in example environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, for each application programming interface request type of a set of application programming interface request types, a corresponding categorization of the application programming interface request type;
    starting a migration of a virtual machine instance from a source location to a target location;
    assigning a version to the virtual machine abstraction associated with the virtual machine instance;
    receiving a customer-initiated application programming interface request directed to a virtual machine abstraction associated with the virtual machine instance;
    determining, based at least in part on whether fulfillment of the application programming interface request would change the virtual machine instance, whether to modify the version;
    determining a corresponding classification of the customer-initiated application programming interface request based at least in part on:
        the version;
        a phase of the migration; and
        a categorization of the application programming interface request type of the customer-initiated application programming interface request; and
    performing one or more operations based at least in part on the corresponding classification of the customer-initiated application programming interface request, the one or more operations including at least one of: allowing the customer-initiated application programming interface request, blocking the customer-initiated application programming interface request, or cancelling the migration.

2. The computer-implemented method of claim 1, wherein the phase of the migration includes at least one of: preparing the target location, commissioning the target location to receive the virtual machine instance, flipping the virtual machine instance from the source location to the target location, or cleaning up the migration.

3. The computer-implemented method of claim 2, wherein the one or more operations include cancelling the migration as a result of the phase of the migration including flipping the virtual machine instance.

4. The computer-implemented method of claim 1, wherein determining whether to modify the version includes determining to modify the version as a result of the customer-initiated application programming interface request causing a mutation of the virtual machine abstraction.

5. A system, comprising at least one computing device configured to implement one or more services, wherein the one or more services:
    start a migration of a virtual machine instance from a source location to a target location;
    assign a version to a virtual machine abstraction associated with the virtual machine instance;
    receive a request directed to the virtual machine instance that is independent of the migration;
    determine, based at least in part on whether fulfillment of the request would change the virtual machine instance, whether to modify the version; and
    determine, based at least in part on the version, a phase of the migration, and a request type of the request, a corresponding classification of a set of classifications of the request, the set of classifications including at least one of: a first classification corresponding to a set of operations affecting fulfillment of the request or a second classification corresponding to a set of operations affecting completing of the migration.

6. The system of claim 5, wherein the request is a customer-initiated application programming interface request.

7. The system of claim 5, wherein the one or more services are configured to cancel the migration based at least in part on a determination that a virtual machine abstraction associated with the virtual machine instance has changed.

8. The system of claim 5, wherein the one or more services are further configured to:
    select one or more operations to perform based at least in part on the corresponding classification of the request; and
    perform the one or more operations selected.

9. The system of claim 8, wherein the one or more operations include at least one of: allowing the request, blocking the request, adding the request to a request queue, forwarding the request to the target location, or canceling the migration.

10. The system of claim 8, wherein the classification is at least one of: non-mutating, blockable, unblockable, virtual machine abstraction mutating, or virtual machine instance mutating.

11. The system of claim 10, wherein the one or more operations include allowing the request as a result of the classification being non-mutating.

12. The system of claim 10, wherein the one or more operations include cancelling the migration as a result of the classification being unblockable.

13. A non-transitory computer-readable storage medium having stored thereon executable instructions that, if executed by one or more processors of a computer system, cause the computer system to:
    start a migration of a virtual machine instance from a source location to a target location;
    assign a version to a virtual machine abstraction associated with the virtual machine instance;
    receive a request directed to the virtual machine instance;
    determine, based at least in part on whether fulfillment of the request would change the virtual machine instance, whether to modify the version;
    determine, based at least in part on the version, a phase of the migration, and a categorization of a request type, a classification of the request; and
    perform one or more operations based at least in part on the classification of the request.

14. The non-transitory computer-readable storage medium of claim 13, wherein the request is an application programming interface request.

15. The non-transitory computer-readable storage medium of claim 13, wherein the executable instructions cause the computer system to determine whether to modify the version include instructions that cause the computer system to determine to modify the version as a result of the request causing a mutation of the virtual machine abstraction.

16. The non-transitory computer-readable storage medium of claim 13, wherein the executable instructions that cause the computer system to determine, based at least in part on the version, the classification of the request further comprise instructions that, if executed by the one or more processors, cause the computer system to:
    determine a target version associated with the request; and
    block the request if the request causes a mutation to the virtual machine instance and the target version is not equal to the version.

17. The non-transitory computer-readable storage medium of claim 13, wherein the executable instructions that cause the computer system to determine, based at least in part on the version, the classification of the request further comprise instructions that, if executed by the one or more processors, cause the computer system to:
    determine a target version associated with the request; and
    cancel the migration if the request causes a mutation to the virtual machine instance and the target version is not equal to the version.

18. The non-transitory computer-readable storage medium of claim 13, wherein the executable instructions that cause the computer system to determine the classification of the request further comprise instructions that, if executed by the one or more processors, cause the computer system to block the request if the request causes a mutation to the virtual machine instance and the phase of the migration is flipping the virtual machine instance.

19. The non-transitory computer-readable storage medium of claim 13, wherein the executable instructions that cause the computer system to determine the classification of the request further comprise instructions that, if executed by the one or more processors, cause the computer system to add the request to a request queue if the request causes a mutation to the virtual machine instance and the phase of the migration is flipping the virtual machine instance.

20. The non-transitory computer-readable storage medium of claim 13, wherein the executable instructions that cause the computer system to determine the classification of the request further comprise instructions that, if executed by the one or more processors, cause the computer system to cancel the migration if the request causes a mutation to the virtual machine instance and the phase of the migration is flipping the virtual machine instance.

* * * * *

UNITED STATES PATENT AND TRADEMARK OFFICE
CERTIFICATE OF CORRECTION

| | |
|---|---|
| PATENT NO. | : 10,228,969 B1 |
| APPLICATION NO. | : 14/750978 |
| DATED | : March 12, 2019 |
| INVENTOR(S) | : Diwaker Gupta et al. |

Page 1 of 1

It is certified that error appears in the above-identified patent and that said Letters Patent is hereby corrected as shown below:

On the Title Page

Item (72) Inventors, Line number 4:
"Rensberg, Cape Town (ZA)"

Should read as:
--Rensburg, Cape Town (ZA)--

Signed and Sealed this
Ninth Day of July, 2019

Andrei Iancu
*Director of the United States Patent and Trademark Office*